(12) United States Patent
Ugawa

(10) Patent No.: US 9,113,073 B2
(45) Date of Patent: Aug. 18, 2015

(54) IMAGING APPARATUS AND IMAGING METHOD OF THE SAME, AND STORAGE MEDIUM TO STORE COMPUTER-PROCESSIBLE TRACKING PROGRAM

(71) Applicant: Olympus Imaging Corp., Shibuya-ku, Tokyo (JP)

(72) Inventor: Akira Ugawa, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 14/305,301

(22) Filed: Jun. 16, 2014

(65) Prior Publication Data

US 2014/0293086 A1 Oct. 2, 2014

Related U.S. Application Data

(63) Continuation of application No. PCT/JP2012/082364, filed on Dec. 13, 2012.

(30) Foreign Application Priority Data

Dec. 16, 2011 (JP) .................................. 2011-275924

(51) Int. Cl.
*H04N 5/232* (2006.01)
*G06F 3/0482* (2013.01)
(Continued)

(52) U.S. Cl.
CPC .......... *H04N 5/23216* (2013.01); *G06F 3/0481* (2013.01); *G06F 3/0482* (2013.01); *G06F 3/0486* (2013.01); *G06F 3/0488* (2013.01);
(Continued)

(58) Field of Classification Search
CPC ........... H04N 5/23216; H04N 5/23219; G06F 3/0482; G06F 3/0486; G06F 3/0481; G06F 3/04845; G06F 3/04842; G06F 3/0488
USPC ..................................... 348/345–356, 333.02
See application file for complete search history.

(56) References Cited

U.S. PATENT DOCUMENTS

2009/0244357 A1 10/2009 Huang
2010/0062803 A1* 3/2010 Yun et al. ................... 455/556.1
(Continued)

FOREIGN PATENT DOCUMENTS

EP 2 267 716 12/2010
JP 2006-101186 4/2006
(Continued)

OTHER PUBLICATIONS

International Preliminary Report of Patentability for International Patent Application No. PCT/JP2012/082364, mailed on Jun. 26, 2013 (6 pgs.).

(Continued)

*Primary Examiner* — Nelson D. Hernández Hernández
(74) *Attorney, Agent, or Firm* — John C. Pokotylo; Straub & Pokotylo

(57) ABSTRACT

An imaging apparatus includes a display unit, a touch panel, a frame display controller, an imaging controller. The frame display controller displays a frame for focus on the display unit if an operation portion approaches the touch panel, and moves the frame for focus in accordance with the movement of the operation portion that approaches the touch panel. The imaging controller performs focusing on the subject in the frame for focus and then performs imaging in response to a photography instruction.

14 Claims, 19 Drawing Sheets

(51) Int. Cl.
- *G06F 3/0484* (2013.01)
- *G06F 3/0481* (2013.01)
- *G06F 3/0486* (2013.01)
- *G06F 3/0488* (2013.01)

(52) U.S. Cl.
CPC ........ *G06F 3/04842* (2013.01); *G06F 3/04845* (2013.01); *H04N 5/23212* (2013.01); *H04N 5/23219* (2013.01); *H04N 5/23293* (2013.01); *G06F 2203/04101* (2013.01)

(56) References Cited

U.S. PATENT DOCUMENTS

| | | | |
|---|---|---|---|
| 2011/0018827 A1 | 1/2011 | Wang | |
| 2011/0084962 A1* | 4/2011 | Kim et al. | 345/419 |
| 2011/0246877 A1* | 10/2011 | Kwak et al. | 715/702 |
| 2011/0267530 A1 | 11/2011 | Chun | |
| 2012/0119988 A1* | 5/2012 | Izumi | 345/156 |

FOREIGN PATENT DOCUMENTS

| | | |
|---|---|---|
| JP | 2006-319903 | 11/2006 |
| JP | 2009-239733 | 10/2009 |
| JP | 2011-009846 | 1/2011 |
| JP | 2011-028345 | 2/2011 |
| JP | 2013-068671 | 4/2013 |

OTHER PUBLICATIONS

Office Action from corresponding Japanese Patent Application No. 2013-516885, mailed May 28, 2013 (3 pgs.) with translation (4 pgs.).

International Search Report to PCT/JP2012/082364, with translation.

Search Report from corresponding European Patent Application No. 12 85 8021, mailed Feb. 10, 2015 (12 pgs.).

Office Action from corresponding Korean application No. 10-2014-7017340 mailed Jun. 8, 2015 (4 pgs.), with English language translation (4 pgs.).

* cited by examiner

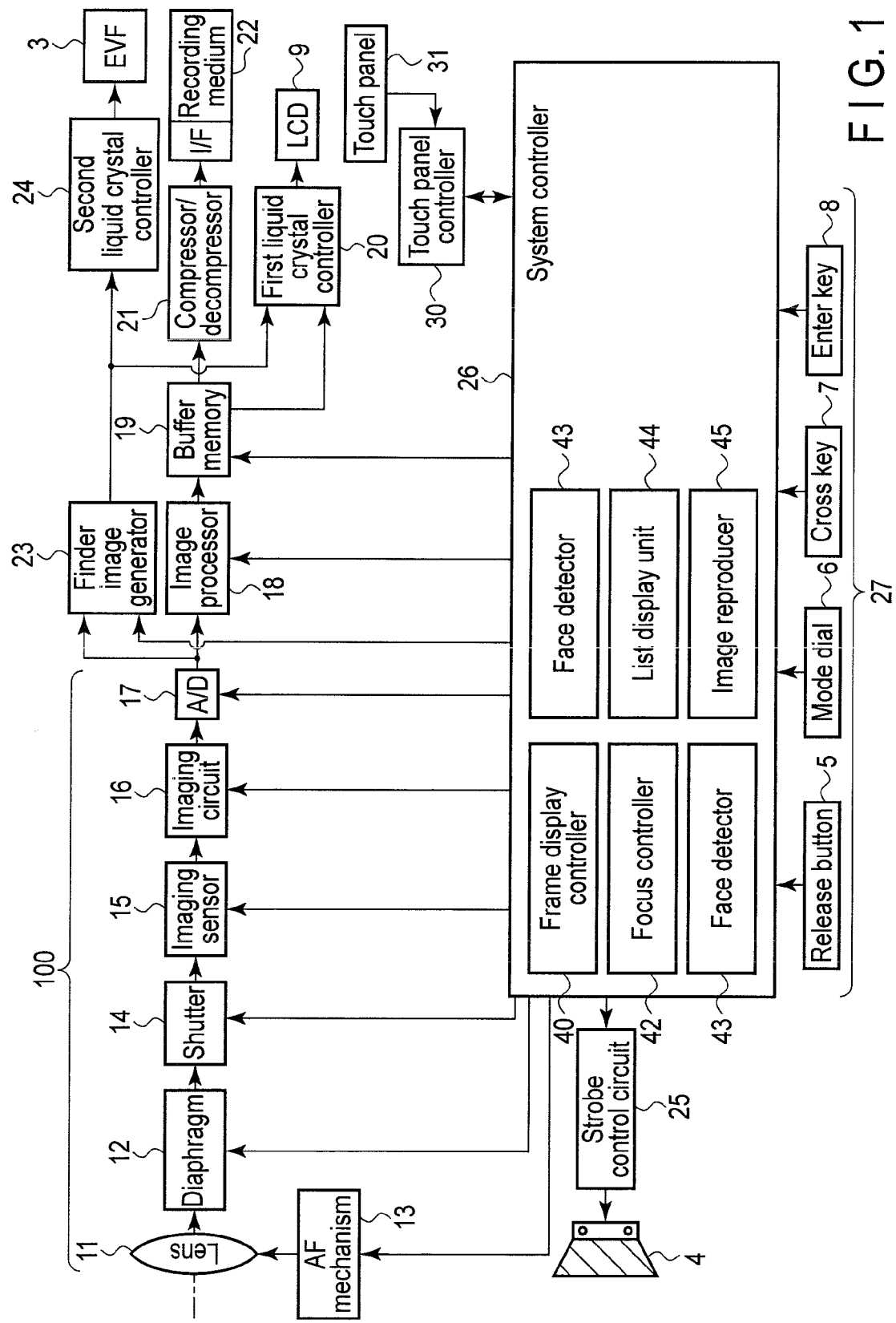
F I G. 1

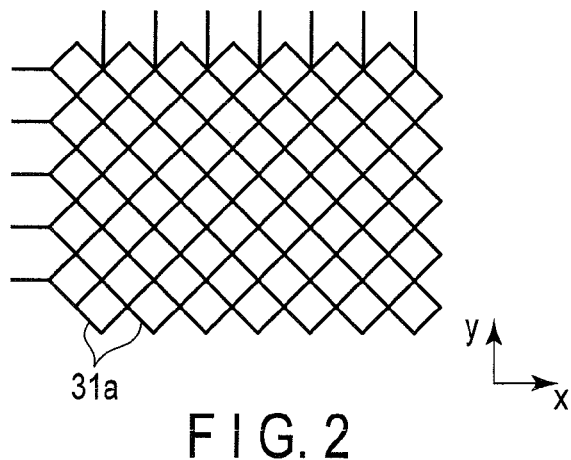
F I G. 2
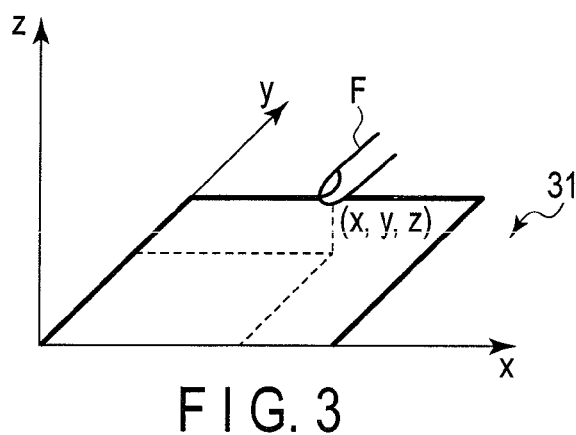
F I G. 3
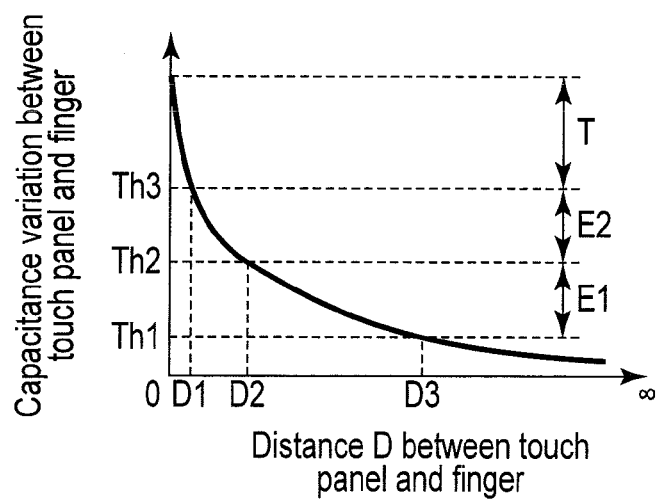
F I G. 4

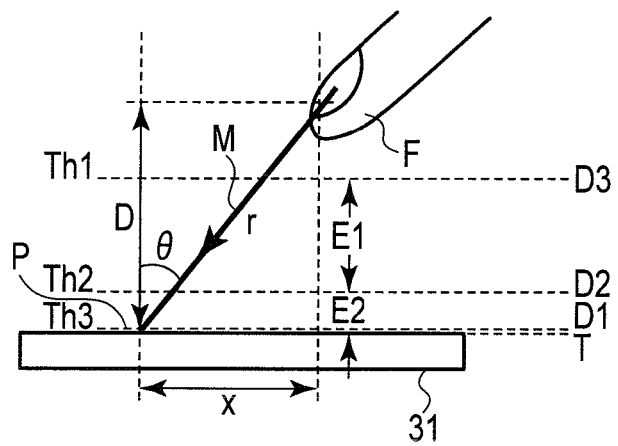
FIG. 5
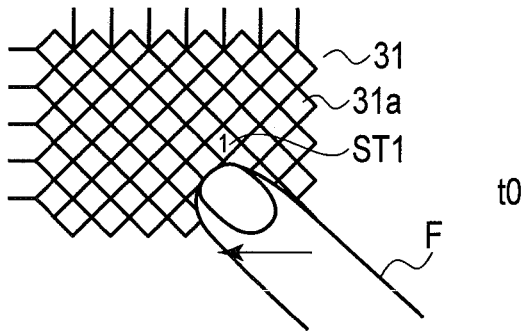
FIG. 6A    t0
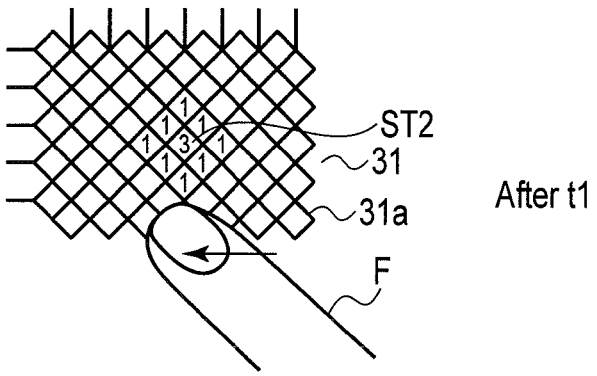
FIG. 6B    After t1
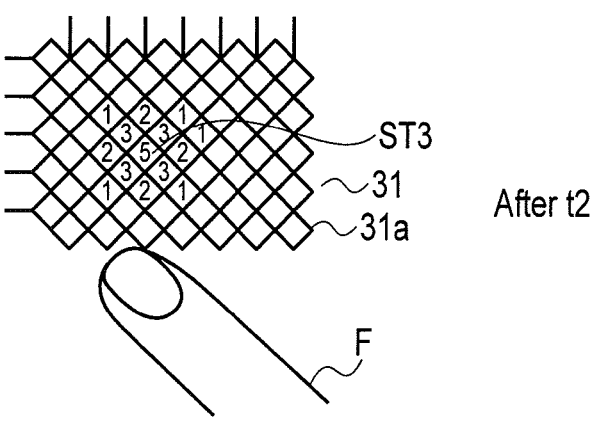
FIG. 6C    After t2

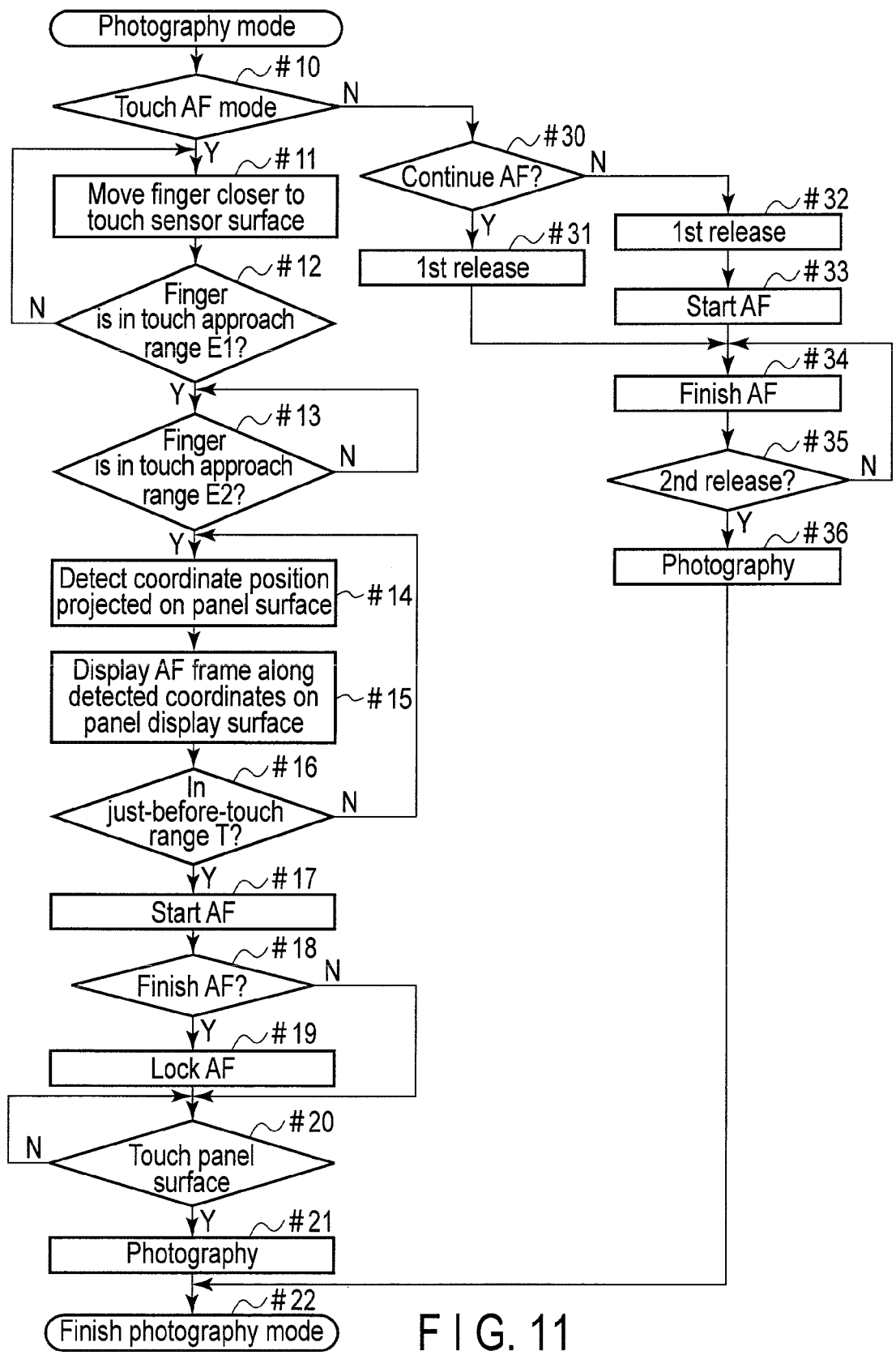
F I G. 11

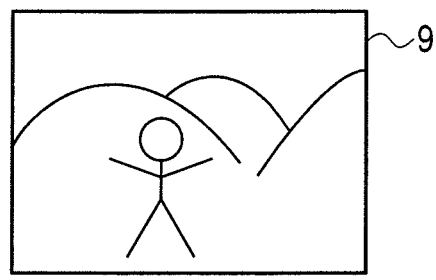 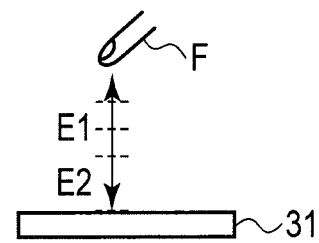
F I G. 13A　　　　　F I G. 13B
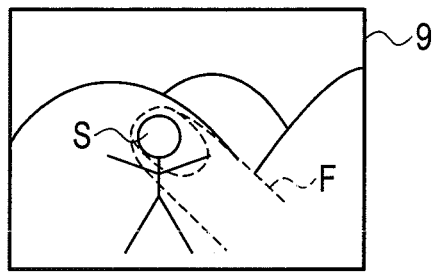 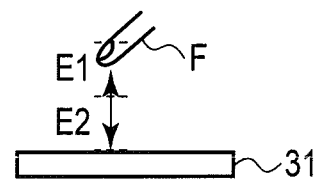
F I G. 14A　　　　　F I G. 14B
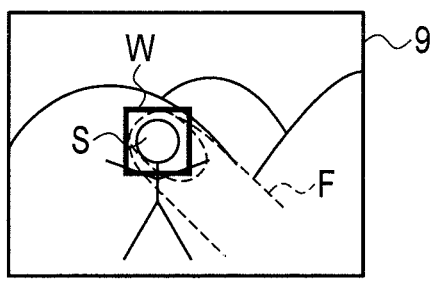 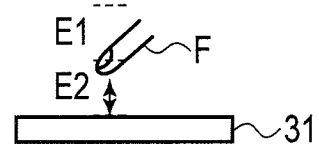
F I G. 15A　　　　　F I G. 15B

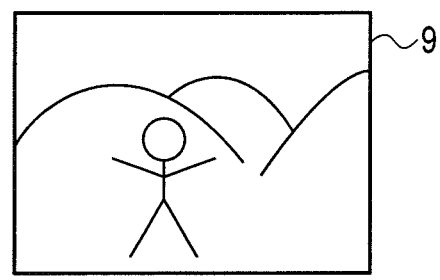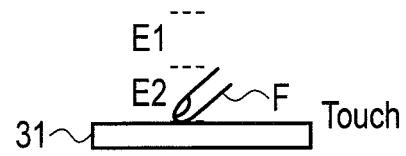
F I G. 16A   F I G. 16B

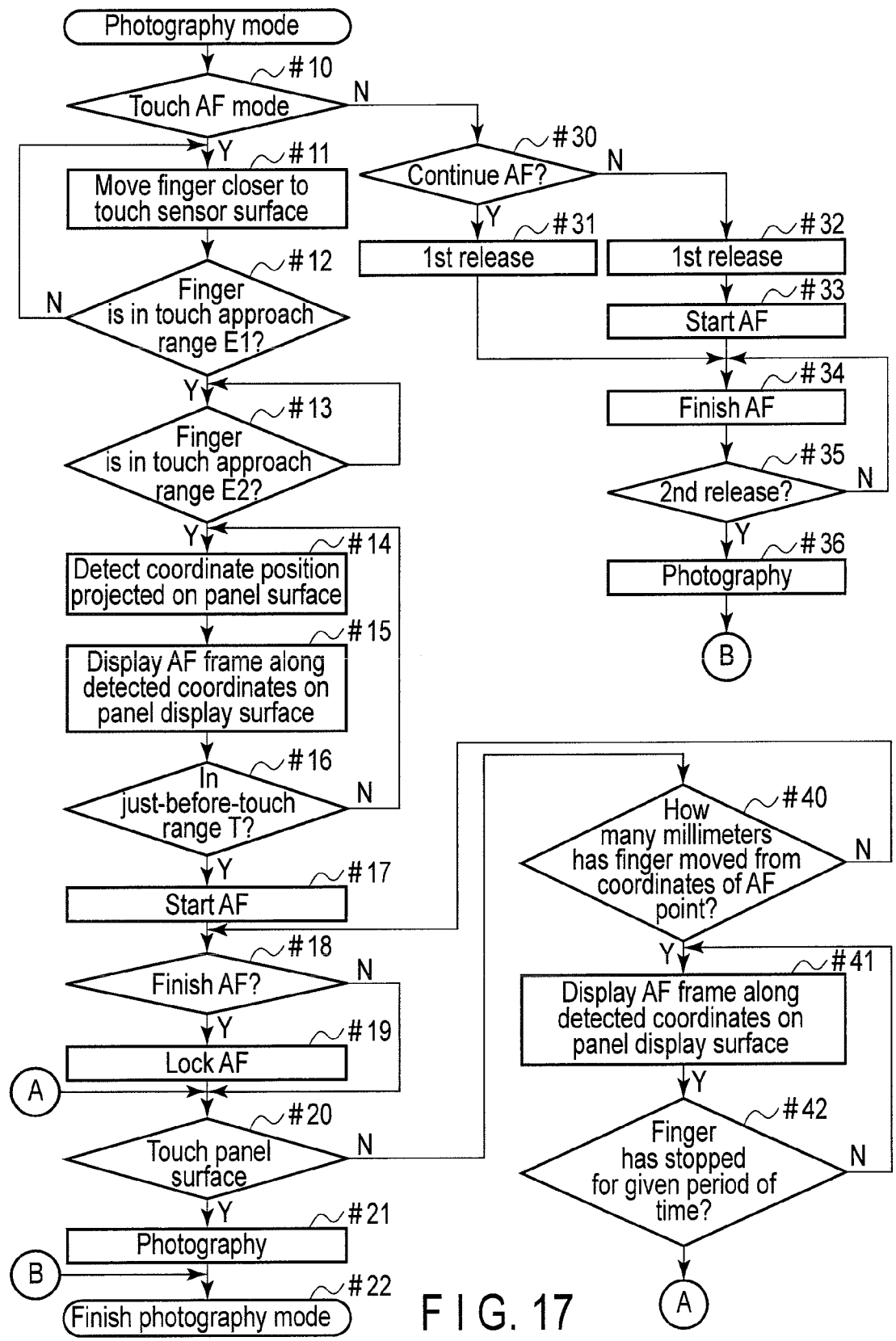
F I G. 17

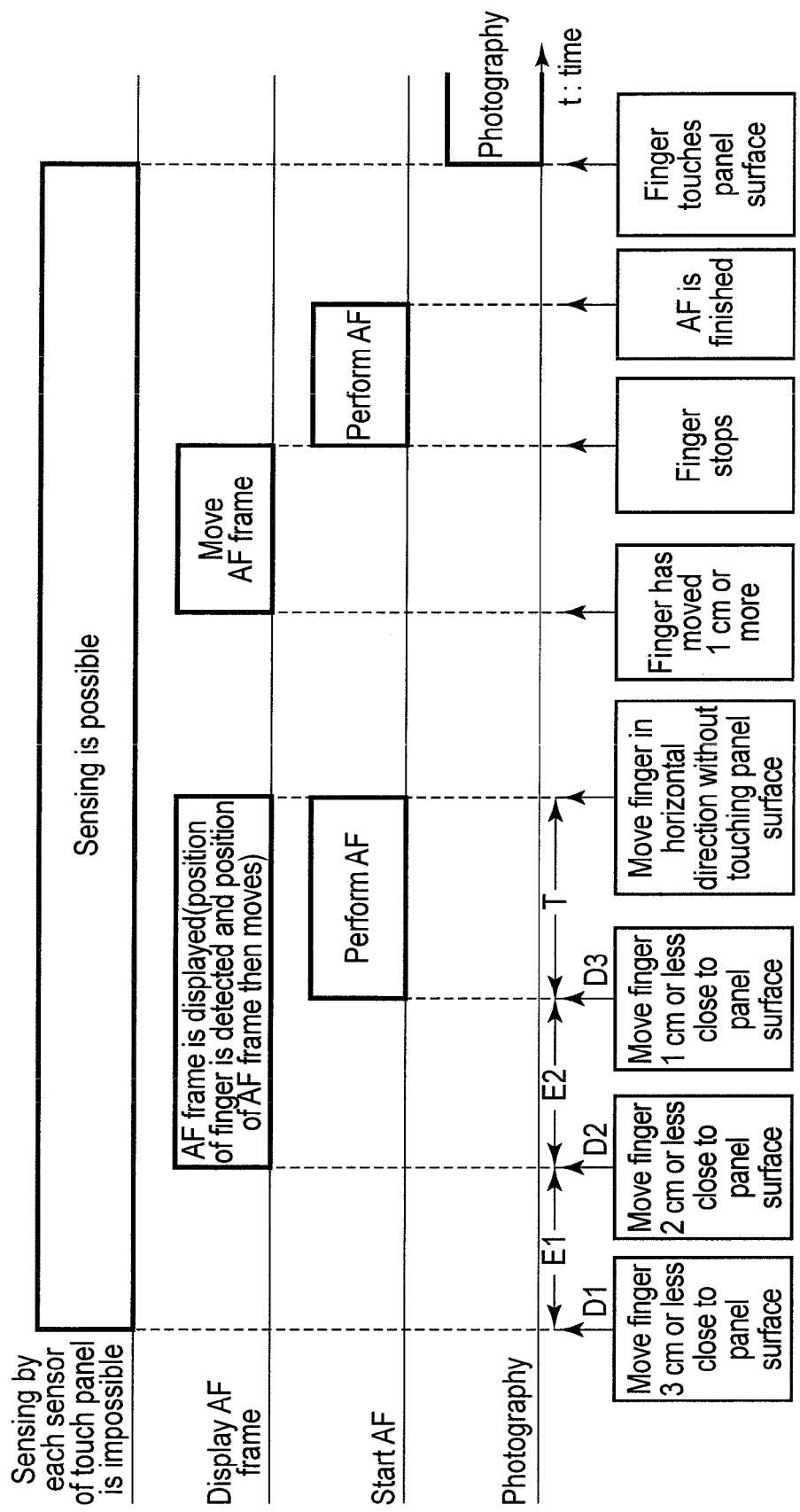
F I G. 18

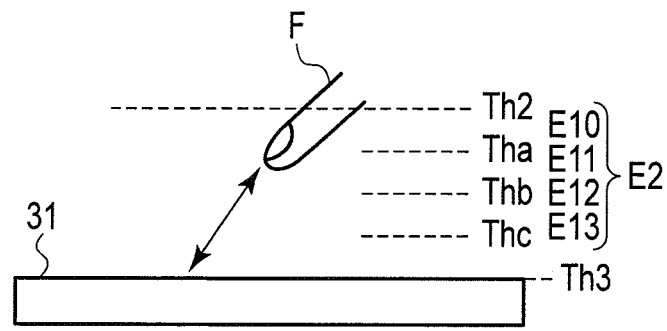
F I G. 23
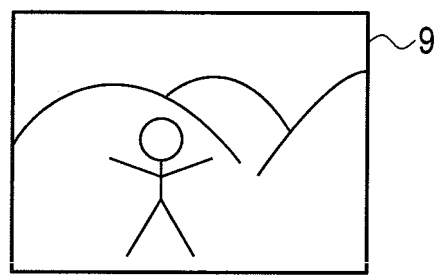
F I G. 24A
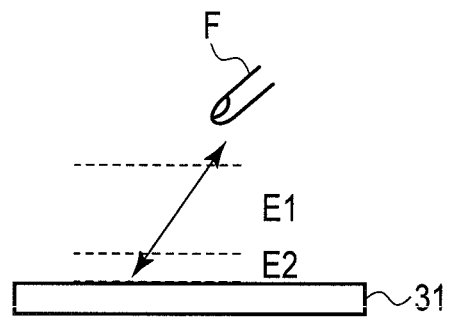
F I G. 24B
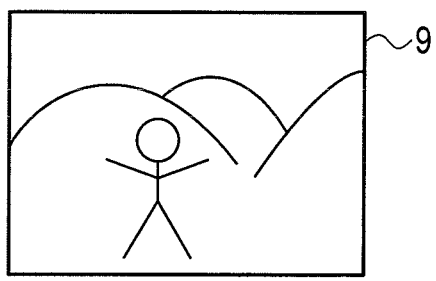
F I G. 25A
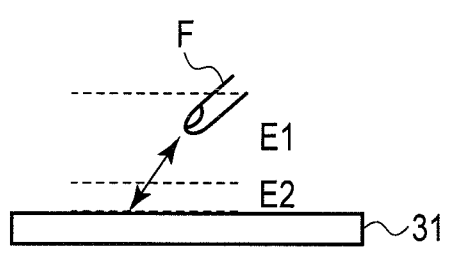
F I G. 25B

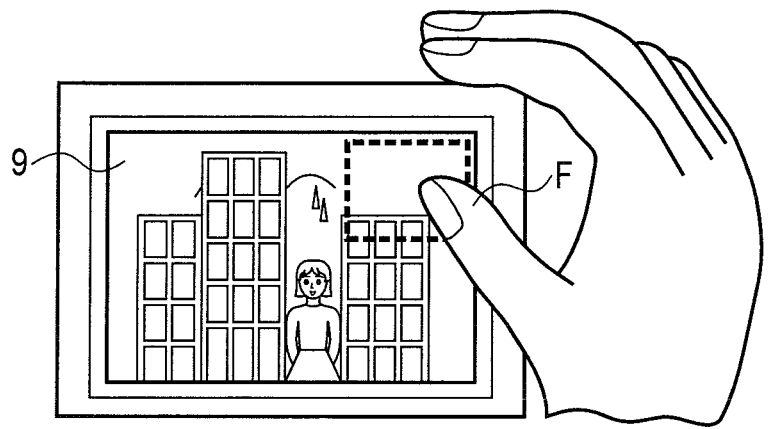
F I G. 29A
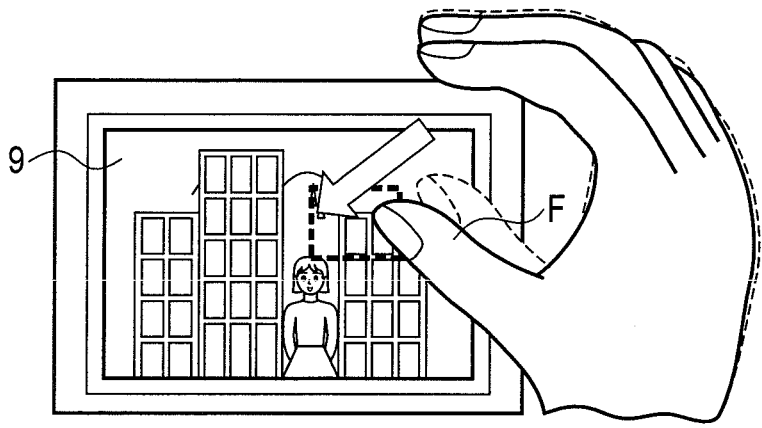
F I G. 29B
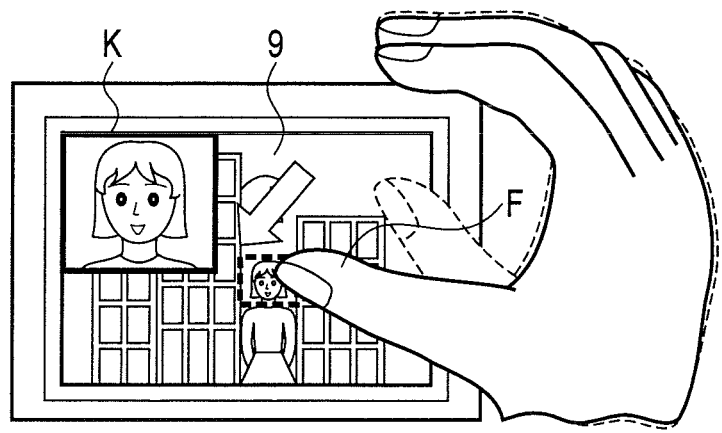
F I G. 29C

IMAGING APPARATUS AND IMAGING METHOD OF THE SAME, AND STORAGE MEDIUM TO STORE COMPUTER-PROCESSIBLE TRACKING PROGRAM

CROSS-REFERENCE TO RELATED APPLICATIONS

This application is a Continuation Application of PCT Application No. PCT/JP2012/082364, filed Dec. 13, 2012 and based upon and claiming the benefit of priority from prior Japanese Patent Application No. 2011-275924, Dec. 16, 2011, the entire contents of all of which are incorporated herein by reference.

BACKGROUND OF THE INVENTION

1. Field of the Invention

The present invention relates to an imaging apparatus wherein a touch panel is provided in a display unit which displays an image acquired by imaging and an image corresponding to a part on a touch panel touched by an operation portion such as a finger of a user is, for example, displayed in a magnified form.

2. Description of the Related Art

For example, a technique disclosed in Jpn. Pat. Appln. KOKAI Publication No. 2006-101186 is known as the above-mentioned imaging apparatus. According to this technique, a particular subject to be tracked can be selected by an easy operation during photography. The subject to be tracked is selected in the following manner according to this technique. A touch panel is provided on a monitor. If this touch panel is touched, a particular part corresponding to the touched place is extracted from a displayed image. This particular part is compared with an image displayed by a video signal generated after the extraction of the particular part. An image portion corresponding to the particular part is detected from the video signal.

BRIEF SUMMARY OF THE INVENTION

An imaging apparatus according to aspect of the present invention comprises a display unit which displays a moving image or a still image, a touch panel provided in the display unit, a frame display controller which displays a frame for focus on the display unit if an operation portion approaches the touch panel, and moves the frame for focus in accordance with the movement of the operation portion that approaches the touch panel, and an imaging controller which performs focusing on the subject in the frame for focus and then performs imaging in response to a photography instruction.

An imaging method of an imaging apparatus according to aspect of the present invention comprises detecting whether an operation portion approaches a touch panel provided in a display unit which displays a moving image or a still image, displaying a frame for focus on the display unit if an operation portion approaches the touch panel, and moving the frame for focus in accordance with the movement of the operation portion that approaches the touch panel, and performing focusing on the subject in the frame for focus and then performing imaging for the subject in response to a photography instruction.

A non-transitory computer readable storage medium storing a tracking program according to aspect of the present invention comprises a detection function to detect whether an operation portion approaches or has contacted a touch panel provided in a display unit which displays a moving image or a still image, a tracking function to display a frame for focus on the display unit if an operation portion approaches the touch panel, and move the frame for focus in accordance with the movement of the operation portion that approaches the touch panel, and an imaging function to perform focusing on the subject in the frame for focus and then perform imaging for the subject in response to a photography instruction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a configuration diagram showing a first embodiment of an imaging apparatus according to the present invention;

FIG. 2 is a schematic diagram showing a sensor pattern of a touch panel in the same apparatus;

FIG. 3 is a graph showing a situation in which, for example, a finger of a user is brought close to the touch panel in the same apparatus;

FIG. 4 is a graph showing a capacitance change between the touch panel in the same apparatus and a finger F of a user;

FIG. 5 is a diagram showing that the finger of the user is about to touch the touch panel in the same apparatus at an angle;

FIG. 6A is a diagram showing the process of a change in capacitance value when the finger of the user is about to touch the touch panel in the same apparatus;

FIG. 6B is a diagram showing the process of a change in capacitance value when the finger of the user is about to touch the touch panel in the same apparatus;

FIG. 6C is a diagram showing the process of a change in capacitance value when the finger of the user is about to touch the touch panel in the same apparatus;

FIG. 11 is a photography mode flowchart in the first imaging operation by the same apparatus;

FIG. 13A is a diagram showing a displayed image in the same apparatus;

FIG. 13B is a diagram showing the position of the finger of the user in the situation in which the finger of the user is about to touch the touch panel in the same apparatus;

FIG. 14A is a diagram showing a displayed image in the same apparatus;

FIG. 14B is a diagram showing the position of the finger of the user in the situation in which the finger of the user has entered a first approach range relative to the touch panel in the same apparatus;

FIG. 15A is a diagram showing a displayed image in the same apparatus;

FIG. 15B is a diagram showing the position of the finger of the user in the situation in which the finger of the user has entered a second approach range relative to the touch panel in the same apparatus;

FIG. 16A is a diagram showing in the same apparatus;

FIG. 16B is a diagram showing the position of the finger of the user in the situation in which the finger of the user has touched the touch panel in the same apparatus;

FIG. 17 is a photography mode flowchart in a second imaging operation by the same apparatus;

FIG. 18 is an imaging operation timing chart in the second imaging operation by the same apparatus;

FIG. 23 is a schematic diagram showing size ranges for changing the size of the frame for focus in the same apparatus;

FIG. 24A is a diagram showing a displayed image in the same apparatus;

FIG. 24B is a diagram showing the position of the finger of the user in the situation in which the finger of the user is approaching to touch the touch panel in an inclined direction in the same apparatus;

FIG. 25A is a diagram showing a displayed image in the same apparatus;

FIG. 25B is a diagram showing the position of the finger of the user in the situation in which the finger of the user has approached and entered the first approach range in the inclined direction relative to the touch panel in the same apparatus;

FIG. 29A is a diagram showing an example of how to display the frame for focus on a display screen of the liquid crystal display in the same apparatus;

FIG. 29B is a diagram showing an example of how to display the frame for focus on a display screen of the liquid crystal display in the same apparatus;

FIG. 29C is a diagram showing an example of how to display the frame for focus on a display screen of the liquid crystal display in the same apparatus.

DETAILED DESCRIPTION OF THE INVENTION

Figure 7:
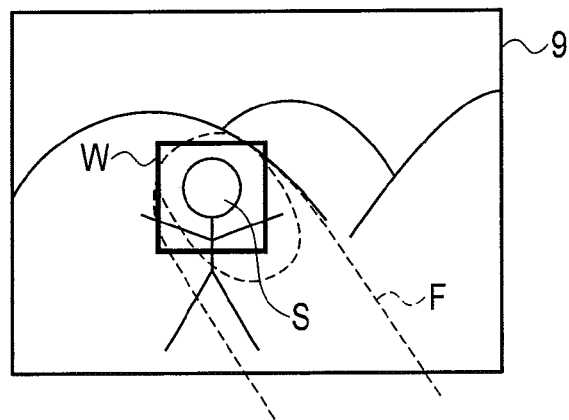
FIG. 7 is a diagram showing a frame for focus displayed on a display surface of a liquid crystal display in the same apparatus.

A first embodiment of the present invention is described below with reference to the drawings.

FIG. 1 shows a configuration diagram of an imaging apparatus. An imaging unit 100 images a subject, and outputs a relevant imaging signal. The imaging unit 100 includes a lens 11, a diaphragm 12, an autofocus (AF) mechanism 13, a shutter 14, an imaging sensor 15, an imaging circuit 16, and an A/D converter 17. A light flux from the subject enters the imaging sensor 15 from the lens 11 through the diaphragm 12 and the shutter 14. The imaging sensor 15 converts the entered light flux to an electric signal. The imaging circuit 16 outputs the electric signal from the imaging sensor 15 as an analog imaging signal. The A/D converter 17 converts the analog imaging signal from the imaging circuit 16 to a digital imaging signal in a predetermined format, and then sends the digital imaging signal to an image processor 18 and a finder image generator 23. The AF mechanism 13 moves the lens 11 in an optical axis direction, and performs AF for the subject.

For the digital imaging signal converted by the A/D converter 17, the image processor 18 performs predetermined image processing, for example, adjustments including a color correction, a gray scale correction, and a gamma (γ) correction of an image to be represented by the image data. The image processor 18 temporarily stores the image signal after the above adjustments in a buffer memory 19.

A compressor/decompressor 21 compresses/decompresses the image signal temporarily stored in the buffer memory 19, forms the image signal into a format suitable for recording in a recording medium 22 to generate main image data, and records the main image data in the recording medium 22 via an interface 22a.

A first liquid crystal controller 20 comprises what is known as a live view function to read the image signal temporarily stored in the buffer memory 19, generate a through-image in a format suitable for display on a liquid crystal display (hereinafter abbreviated as an LCD) 9 for the image signal, and display the through-image on the LCD 9.

The first liquid crystal controller 20 reads the image data recorded in the recording medium 22 through the buffer memory 19 and the compressor/decompressor 21, and displays this image data on the LCD 9.

The finder image generator 23 generates finder image data for moving images in a format suitable for display on a display device 3 such as an EVF from the digital imaging signal converted by the A/D converter 17.

A second liquid crystal controller 24 displays, on the display device 3, for example, the EVF, the finder image data for moving images generated by the finder image generator 23.

A touch panel 31 is provided on a display screen of the LCD 9. The touch panel 31 detects a touch (contact) by an operation portion such as a finger of a user which touches the touch panel 31, and outputs a coordinate signal corresponding to the touched part.

A touch panel controller 30 controls the driving of the touch panel 31, inputs a coordinate signal output from the touch panel 31, and judges the touched part on the touch panel 31. The touch panel controller 30 judges whether, for example, the finger of the user has approached or touched the touch panel 31 in accordance with the change in capacitance between the touch panel 31 and, for example, the finger of the user.

FIG. 2 shows a schematic diagram of a sensor pattern of the touch panel 31. In the touch panel 31, sensors 31$a$ are arranged at regular intervals in x-y directions. As described above, in accordance with the change in capacitance between the touch panel 31 and, for example, the finger of the user, each of the sensors 31$a$ judges whether the finger of the user is gradually approaching to touch the touch panel 31 or the finger of the user has touched the touch panel 31. Since the touch panel 31 has a protective layer such as a protective film, protective glass, or a protective panel formed on its surface, a touch by the finger of the user includes a touch on the protective layer. Each of the sensors 31$a$ is of a capacitive projection type, but a self-capacitance method or a mutual-capacitance method may also be used instead. According to the self-capacitance method, a capacitance value generated between each of the sensors 31$a$ and, for example, the finger of the user is sensed. According to the mutual-capacitance method, a capacitance change between the adjacent sensors 31$a$ is sensed if, for example, the finger of the user approaches each of the sensors 31$a$.

FIG. 3 shows a situation in which, for example, a finger F of the user has approached the capacitance type touch panel 31. FIG. 4 shows a capacitance change between the touch panel 31 and the finger F of the user if the finger F of the user has approached the capacitance type touch panel 31. The finger F of the user is located, for example, above coordinates (x, y, z) on the surface of the touch panel 31. The capacitance between the touch panel 31 and the finger F of the user increases in a quadric manner as the finger F of the user approaches the touch panel 31. Therefore, each of the sensors 31$a$ outputs a signal corresponding to the capacitance between the touch panel 31 and the finger F of the user, that is, a signal corresponding to a distance D (hereinafter referred to as an inter-touch distance) between the touch panel 31 and the finger F of the user.

Touch approach ranges E1 to En and a just-before-touch range T are set to judge whether the finger F of the user has approached or touched the touch panel 31. For example, the first and second touch approach ranges E1 and E2 and the just-before-touch range T are set in the touch panel 31, as shown in FIG. 4. The first and second touch approach ranges E1 and E2 and the just-before-touch range T are set as follows: If the inter-touch distance D between the touch panel 31 and the finger F of the user is D3, D2, or D1 (D3>D2>D1), a range between the distances D3 and D2 is set as the first touch approach range E1, a range between the distances D2 and D3 is set as the second touch approach range E2, and a range within the distance D3 and before the finger F of the user touches the touch panel 31 is set as the just-before-touch range T.

The first and second touch approach ranges E1 and E2 and the just-before-touch range T are divided by capacitance values Th1, Th2, and Th3 between the touch panel 31 and the finger F of the user. The relation of magnitude between the capacitance values Th1, Th2, and Th3 is Th1<Th2<Th3. Accordingly, the first touch approach range E1 is between the capacitance values Th1 and Th2. The second touch approach range E2 is between the capacitance values Th2 and Th3. The just-before-touch range T is a small range including the capacitance value Th3.

Therefore, the touch panel controller 30 monitors the operation in a touch AF mode, that is, a change in capacitance value detected by each of the sensors 31$a$ of the touch panel 31, and detects a region in which the capacitance value changes, as a coordinate position to be touched. The touch panel controller 30 monitors a change in capacitance value in the touch panel 31, compares the monitored capacitance value with each of the capacitance values Th1, Th2 and Th3, and judges whether the finger F of the user is present in the first touch approach range E1, in the second touch approach range E2, or in the just-before-touch range T relative to the touch panel 31, and whether the finger F of the user has touched the touch panel 31.

If the finger F of the user is about to touch the touch panel 31, the finger F of the user touches the touch panel 31 at an angle $\theta$ in many cases. FIG. 5 shows that the finger F of the user is about to touch the touch panel 31 in a direction inclined at the angle $\theta$. Here, the inter-touch distance between the finger F of the user and a display surface of the touch panel 31 is D (including D1, D2, and D3), a horizontal distance between a point P to be touched and the finger F of the user is x, and an angle from the point P to be touched is $\theta$ (an angle with a line perpendicular to the display surface of the touch panel 31).

FIG. 6A, FIG. 6B, and FIG. 6C show the process of a change in capacitance value at regular time intervals if the finger F of the user is about to touch the touch panel 31. In these drawings, numerical values "1", "2" . . . "5" schematically indicating capacitance values are shown in the sensors 31$a$. The higher numerical values "1", "2" . . . "5" indicate higher capacitance values.

As the finger F of the user approaches the touch panel 31, the capacitance value of the touch panel 31 increases. If the inter-touch distance D between the finger F of the user and the display surface of the touch panel 31 is great, the change amount of the capacitance in each of the sensors 31$a$ is small. The touch panel controller 30 determines, as a coordinate position ST1 of an origin, a place where a change in capacitance is detected on the touch panel 31; for example, a place where the numerical value "1" appears as shown in FIG. 6A.

At a time t1 after a time t0 at which the coordinate position ST1 of the finger F of the user as the origin has been detected, if the finger F of the user approaches the display surface of the touch panel 31 and the inter-touch distance D decreases, the capacitance value increases on the touch panel 31. In FIG. 6B, there are more places where the numerical values "3" and "1" appear. The touch panel controller 30 detects a place where the greatest change in capacitance value is shown among the numerical values "3" and "1"; for example, a coordinate position ST2 of the place having the numerical value "3", and finds the horizontal distance x and the inter-touch distance D from the coordinate position ST2 of the place having the numerical value "3" and from the coordinate position ST1 of the origin.

Furthermore, at a time t2 after the time t1, if the finger F of the user approaches the display surface of the touch panel 31 and the inter-touch distance D decreases, the capacitance value further increases on the touch panel 31. In FIG. 6C, there are more places where the numerical values "5", "3" and "1" appear. The touch panel controller 30 detects a place where the greatest change in capacitance value is shown among the numerical values "5", "3" and "1"; for example, a coordinate position ST3 of the place having the numerical value "5", and finds the horizontal distance x and the inter-touch distance D from the coordinate position ST3 of the place having the numerical value "5" and from the coordinate position ST1 of the origin.

After this, the touch panel controller 30 detects a coordinate position STm of the place having the greatest change in capacitance value at regular time intervals, and finds the horizontal movement distance x and the inter-touch distance D from the coordinate position STm and the coordinate position ST1 of the origin. The touch panel controller 30 may find the horizontal movement distance x and the inter-touch distance D from the coordinate position STm of the place having the greatest change in capacitance value and a preceding coordinate position STm−1 at regular time intervals.

The touch panel controller 30 finds a movement direction M of the finger F of the user from each horizontal movement distance x and each inter-touch distance D that are found at regular time intervals, finds the angle θ from the movement direction M, and finds a coordinate position of a candidate point P to be touched by the finger F of the user from the horizontal movement distance x, the inter-touch distance D, and the angle θ.

Another way to calculate the coordinate position of the candidate point P is described. The touch panel controller 30 finds the inter-touch distance D between the finger F of the user and the display surface of the touch panel 31 from the capacitance value detected by each of the sensors 31a of the touch panel 31. The inter-touch distance D and the angle θ of the finger F of the user have the relation of a trigonometric function D=r·cos θ, x=r·sin θ. Therefore, the touch panel controller 30 calculates the trigonometric function D=r·cos θ, x=r·sin θ by using the inter-touch distance D and the angle θ of the finger F of the user, and thereby finds the horizontal movement distance x. From the inter-touch distance D, the angle θ, and the horizontal movement distance x, the touch panel controller 30 finds the coordinate position of the candidate point P to be touched by the finger F of the user.

The angle θ of the finger F of the user may be set at a preset angle, for example, 45°. The angle θ (=45°) of the finger F of the user is an angle which the finger F of the user generally makes when touching the touch panel 31.

A system controller 26 controls a series of imaging operations in which the subject is imaged. The system controller 26 controls the imaging unit 100, the image processor 18, the buffer memory 19, the compressor/decompressor 21, the interface 22a, the finder image generator 23, the touch panel controller 30, the first liquid crystal controller 20, and the second liquid crystal controller 24. An operation unit 27 and a strobe control circuit 25 are connected to the system controller 26. The operation unit 27 has, for example, a release button 5, a mode dial 6, a cross key 7, and an enter key 8. The operation unit 27 includes, for example, a power button and an end button. The strobe control circuit 25 controls the operation of a strobe 4 which generates a flash light.

This system controller 26 includes a frame display controller 40, a focus controller 41, an imaging controller 42, a face detector 43, a list display unit 44, and an image reproducer 45.

If the finger F of the user approaches to touch the touch panel 31, the frame display controller 40 displays a frame W for focus in an image region corresponding to the part of the touch panel 31 to be touched on the image displayed on the display screen of the LCD 9 as shown in FIG. 7. In this case, the frame display controller 40 displays the frame W for focus around the coordinate position of the candidate point P found by the touch panel controller 30.

The frame display controller 40 displays the frame W for focus if the finger F of the user has entered the second touch approach range E2. The frame W for focus may be displayed from the time if the finger F of the user has entered the first touch approach range E1.

If the frame W for focus is displayed when the finger F of the user is approaching the touch panel 31, the part of the touch panel 31 to be touched by the finger F of the user can be checked on the display screen of the LCD 9 before the finger F of the user touches the touch panel 31. Since the part to be touched by the finger F of the user is located before the finger F of the user touches the touch panel 31, the frame W for focus can be checked without being hidden by the finger F of the user. If it is found out from this check that the region to be touched by the finger F of the user is different from the region desired by the user, the region to be touched by the finger F of the user can be changed.

Since the coordinate position of the candidate point P to be touched by the finger F of the user can be previously found by the touch panel controller 30, the focus controller 41 described later can focus on the subject corresponding to the coordinate position of the candidate point P before the finger F of the user touches the touch panel 31. The time before focusing can be shorter than if focusing is performed after the finger F of the user has touched the touch panel 31.

The frame W for focus is set to be, for example, a face S of a person as a main subject by the user operation. The frame W for focus is formed into, for example, a square, but is not limited thereto. For example, the frame W for focus may be formed into a circle, a rectangle, or a double circle.

Figure 8:
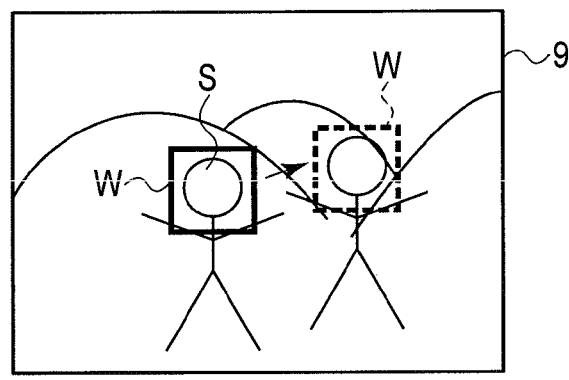
FIG. 8 is a diagram showing the movement of the frame for focus following the movement of the finger of the user in the same apparatus.

If the finger F of the user moves in a direction flush with the display screen of the LCD 9 as shown in FIG. 8 so that the finger F of the user is close to the touch panel 31 and, for example, the finger F of the user is within the second touch approach range E2, the frame display controller 40 moves the frame W for focus on the display screen of the LCD 9 in accordance with the movement of the finger F of the user. For example, if the person moves, the frame W for focus is set at the face S of the person who has moved in accordance with the movement of the finger F of the user.

If moving the frame W for focus in accordance with the movement of the finger F of the user, the frame display controller 40 moves the frame W for focus at a speed corresponding to the speed at which the finger F of the user moves; for example, at a speed which increases or decreases in accordance with the increase or decrease in the movement speed of the finger F of the user. If moving the frame W for focus in accordance with the movement of the finger F of the user, the frame display controller 40 moves the frame W for focus in the same direction as the direction in which the finger F of the user moves.

Figure 9:
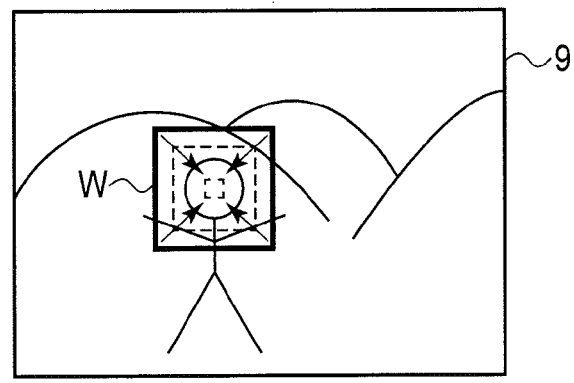
FIG. 9 is a diagram showing how the size of the frame for focus is demagnified or magnified in accordance with the movement speed of the finger of the user in the same apparatus.

The frame display controller 40 demagnifies or magnifies the size of the frame W for focus in accordance with the inter-touch distance D between the finger F of the user and the display surface of the touch panel 31. For example, the frame display controller 40 demagnifies the size of the frame W for focus in an arrow direction as shown in FIG. 9 as the inter-touch distance D decreases, and the frame display controller 40 magnifies the size of the frame W for focus as the inter-touch distance D increases. If the size of the frame W for focus is reduced, it is possible to perform display that is narrowed down to the candidate point P to be touched by the finger F of the user.

If stopping the movement of the imaging apparatus for a preset long time without changing, for example, the photography direction and composition of the subject, the frame display controller 40 may lock the display state of the frame W for focus in the display screen of the LCD 9. If the imaging apparatus moves, the frame display controller 40 unlocks the display state of the frame W for focus.

The focus controller 41 performs processing to focus on the candidate point P on the subject in the frame W for focus before the finger F of the user touches the touch panel 31.

The focus controller 41 does not perform focusing during the movement of the frame W for focus by the frame display controller 40, that is, during the movement in the direction flush with the display screen of the LCD 9. If the movement of the finger F of the user stops, the focus controller 41 performs focusing on the subject in the frame W for focus.

The focus controller 41 may perform focusing after the frame W for focus is displayed.

If the finger F of the user approaches a predetermined approach range among the touch approach ranges E1 to En, for example, the second touch approach range E2, the focus controller 41 performs focusing on the subject in the frame W for focus.

If detecting that the finger F of the user is touching the touch panel 31, the imaging controller 42 performs imaging by the imaging unit 100 at the time of the touch detection.

The face detector 43 detects whether the facial part S of the subject is present in image data, or detects whether the facial part S of the subject is present in the frame W for focus displayed in the image data. The face detector 43 detects the facial part S of the subject present in the image data.

If the facial part S of the person is detected by the face detector 43, the frame display controller 40 may display the frame W for focus for the facial part S of the subject. In the same manner as described above, the display of the frame W for focus is started if the finger F of the user enters the second touch approach range E2. If the facial part S of the subject is photographed as the main subject, the display position of the frame W for focus can be corrected to the facial part S detected by the face detector 43 even if the position of the frame W for focus displayed by the frame display controller 40 is out of position relative to the main subject.

The list display unit 44 displays a list of images on the display screen of the LCD 9 during a reproduction mode. The list display unit 44 reads image data recorded in, for example, the recording medium 22, and displays a list of the image data on the display screen of the LCD 9 via the first liquid crystal controller 20.

If one item on the list of the image data displayed on the display screen of the LCD 9 by the list display unit 44 is selected, the image reproducer 45 displays the selected image data on the display screen of the LCD 9 in a magnified form.

[First Imaging Operation]

Now, a first imaging operation of the apparatus having the above configuration is described with reference to an imaging operation flowchart shown in FIG. 10.

The system controller 26 turns on the power of the touch panel 31 in step #1, and turns on the power of the LCD 9 in step #2.

In step #3, the system controller 26 receives a mode such as a photography mode or the reproduction mode selected by, for example, the user operation performed on the mode dial 6.

In step #4, the system controller 26 judges whether the selected mode is the photography mode or the reproduction mode. When judging that the selected mode is the photography mode, the system controller 26 shifts to step #5, and sets the mode to the photography mode.

An imaging operation in the photography mode is described below with reference to a photography mode flowchart shown in FIG. 11.

Figure 12:
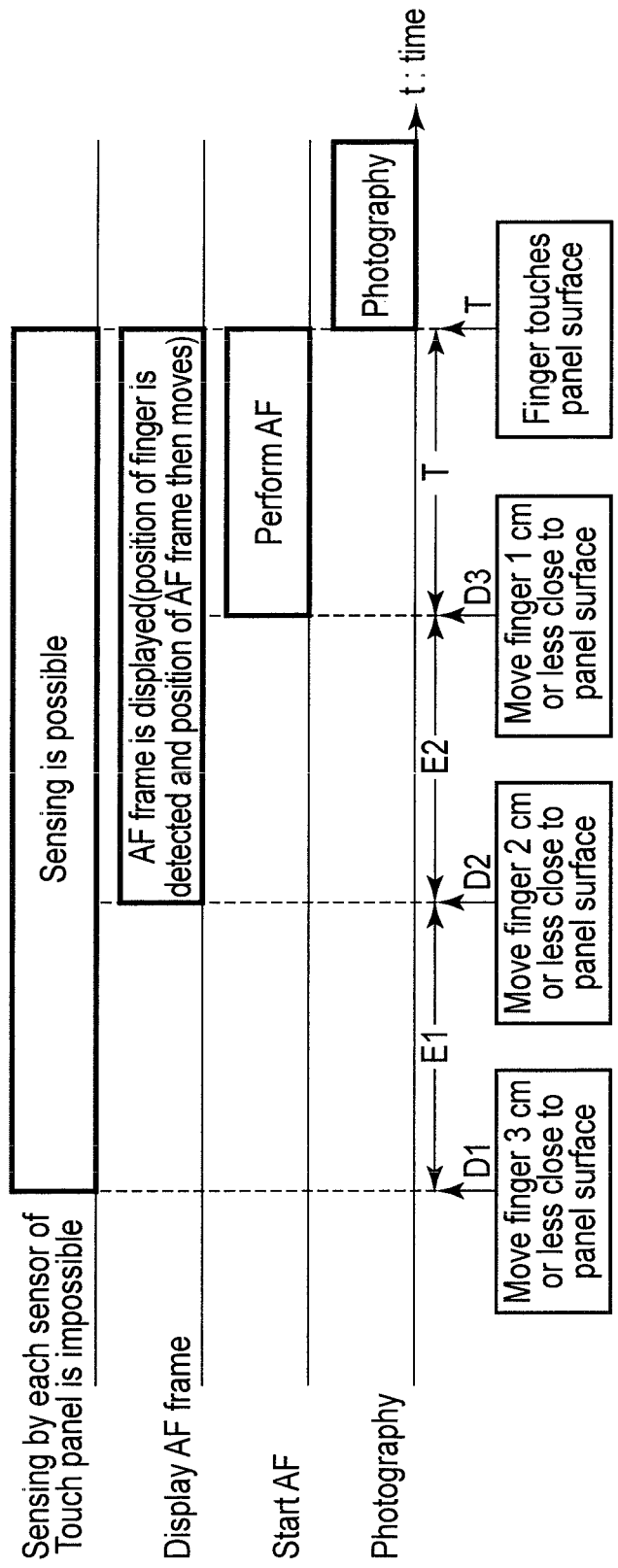
FIG. 12 is an imaging operation timing chart in the first imaging operation by the same apparatus.

FIG. 12 shows an imaging operation timing chart. FIG. 12 shows a period in which a capacitance value generated between the touch panel 31 and, for example, the finger F of the user can be sensed, a display period of the frame W for focus displayed on the display screen of the LCD 9, a period in which autofocusing (AF) is performed, and a period in which imaging is performed.

In the photography mode, the system controller 26 controls the imaging unit 100, the image processor 18, the buffer memory 19, the compressor/decompressor 21, the interface 22a, the finder image generator 23, the touch panel controller 30, the first liquid crystal controller 20, and the second liquid crystal controller 24, and controls a series of imaging operations for imaging the subject.

That is, the light flux from the subject enters the imaging sensor 15 from the lens 11 through the diaphragm 12 and the shutter 14. At the same time, the AF mechanism 13 moves the lens 11 in the optical axis direction, and performs AF for the subject. The imaging sensor 15 converts the entered light flux to an electric signal. The electric signal output from the imaging sensor 15 is output by the imaging circuit 16 as an analog imaging signal. The analog imaging signal is converted to a digital imaging signal in a predetermined format by the A/D converter 17, and then sent to the image processor 18 and the finder image generator 23.

For the digital imaging signal converted by the A/D converter 17, the image processor 18 performs predetermined image processing, for example, adjustments including a color correction, a gray scale correction, and a gamma ($\gamma$) correction of an image to be represented by the image data. The image processor 18 temporarily stores the image signal after the above adjustments in the buffer memory 19.

The first liquid crystal controller 20 reads the image signal temporarily stored in the buffer memory 19, generates a through-image in a format suitable for display on the LCD 9 for the image signal, and live-view-displays the through-image on the LCD 9.

In this photography mode, the system controller 26 judges in step #10 whether the mode is set to a touch autofocus (AF) mode. If the mode is judged to be set to the touch AF mode, the touch panel controller 30 monitors a change in capacitance value in the touch panel 31, and detects the region in which the capacitance value changes, as a coordinate position to be touched. The touch panel controller 30 compares the monitored capacitance value with each of the capacitance values Th1, Th2 and Th3, and judges whether the finger F of the user is present in the first touch approach range E1, in the second touch approach range E2, or in the just-before-touch range T relative to the touch panel 31, and whether the finger F of the user has touched the touch panel 31.

More specifically, in step #11, the touch panel controller 30 monitors a change in capacitance value in the touch panel 31, and judges that the user is bringing the finger F close to the touch panel 31 to touch the touch panel 31. The place to be touched by the finger F of the user is the place on the LCD 9 and on the image desired to be focused in the subject, for example, the part on the touch panel 31 corresponding to the facial part S of the person.

FIG. 13A and FIG. 13B show the situation in which the finger F of the user is about to touch the touch panel 31. FIG. 13A shows the image displayed on the LCD 9 in the above situation. FIG. 13B shows the inter-touch distance D between the touch panel 31 and the finger F of the user in the above situation.

In step #12, the touch panel controller 30 judges whether the finger F of the user is present in the first touch approach range E1 ($D3 \geq D > D2$) as shown in FIG. 14B in accordance with the change in capacitance in the touch panel 31. The first touch approach range E1 is within 30 to 20 mm from the surface of the touch panel 31.

If judging that the finger F of the user is present in the first touch approach range E1, the touch panel controller 30 judges that a capacitance value generated between the touch panel 31 and the finger F of the user can be sensed by each of the sensors 31a of the touch panel 31 and that the finger F of the user is about to touch the touch panel 31. Sensing is possible from the point where the finger F of the user has entered the first touch approach range E1, so that when the finger F of the user is out of the first touch approach range E1, sensing is not performed, and no wasteful electricity is consumed. If the finger F of the user is out of the first touch approach range E1, the touch panel controller 30 can inhibit sensing, perform an operation to increase the distance between the finger F of the user and the touch panel 31, or limit circuit operations and calculations in the system controller 26 so that electricity is not wastefully consumed.

If the range of the capacitance value generated between the touch panel 31 and the finger F of the user is preset, this capacitance value can be differentiated from a capacitance value generated when a material different from the finger F of the user is about to touch the touch panel 31. Thus, it is possible to only judge that the finger F of the user is about to touch the touch panel 31, and prevent a wrong operation resulting from the different material which is about to touch the touch panel 31.

After the finger F of the user has entered the first touch approach range E1 as shown in FIG. 14B, the touch panel controller 30 judges in step #13 whether the finger F of the user is present in the second touch approach range E2 (D2≥D>D1) as shown in FIG. 15B in accordance with the change in capacitance value in the touch panel 31.

If judging that the finger F of the user is present in the second touch approach range E2, the touch panel controller 30 finds a coordinate position of the finger F of the user projected on the touch panel 31 in step #14. That is, if the finger F of the user approaches the display surface of the touch panel 31 and the inter-touch distance D decreases, the capacitance value increases on the touch panel 31 as shown in FIG. 6B, and, for example, there are more places where the numerical values "3" and "1" appear. The touch panel controller 30 detects a place where the greatest change in capacitance value is shown among the numerical values "3" and "1", for example, a coordinate position of the place having the numerical value "3", and from this coordinate position, finds the coordinate position of the finger F of the user.

At the same time, in step #15, the touch panel controller 30 judges from the capacitance value in the touch panel 31 that the finger F of the user has entered the second touch approach range E2, and the touch panel controller 30 sends the relevant message to the frame display controller 40.

On receipt of the message that the finger F of the user is present in the second touch approach range E2, the frame display controller 40 displays the frame W for focus on the LCD 9 as shown in FIG. 15A. Since the frame W for focus is displayed before the finger F of the user touches the touch panel 31, the frame W for focus is not hidden by the finger F of the user, and the part of the touch panel 31 to be touched by the finger F of the user can be checked on the display screen of the LCD 9.

The frame display controller 40 does not display the frame W for focus when the finger F of the user is present in the first touch approach range E1, whereas the frame display controller 40 displays the frame W for focus if the finger F of the user is present in the second touch approach range E2. This is because if the finger F of the user is present in the first touch approach range E1, the distance between the finger F of the user and the touch panel 31 is great, and it is impossible to determine whether the user intends to touch the touch panel 31. This makes it possible to prevent unnecessary display of the frame W for focus.

The inter-touch distance D between the finger F of the user and the touch panel 31 is between the inter-touch distances D2 and D1 shown in FIG. 4. The second touch approach range E2 is within 20 to 10 mm from the surface of the touch panel 31.

In step #16, the touch panel controller 30 judges in accordance with the change in capacitance in the touch panel 31 whether the finger F of the user is present in the just-before-touch range T (D1≥D>D0) as shown in FIG. 16B and has touched the touch panel 31.

If it is judged that the finger F of the user is present in the just-before-touch range T and has touched the touch panel 31, the focus controller 41 starts autofocusing (AF) on the subject in the frame W for focus in step #17.

In step #18, the focus controller 41 judges whether the autofocusing (AF) on the subject in the frame W for focus has finished. If judging that the autofocusing (AF) on the subject in the frame W for focus has finished, the focus controller 41 locks the autofocusing (AF) in step #19.

In step #20, the touch panel controller 30 judges whether the finger F of the user has touched the part of the touch panel 31 corresponding to, for example, the facial part S of the person to be focused in the subject in the frame W for focus as shown in FIG. 16B.

If judging that the finger F of the user has touched the part of the touch panel 31 corresponding to, for example, the facial part S of the person to be focused in the subject in the frame W for focus as shown in FIG. 16B, the touch panel controller 30 judges from the capacitance value in the touch panel 31 that the finger F of the user has touched the touch panel 31, and sends the relevant message to the imaging controller 42.

On receipt of the message from the touch panel controller 30 that the finger F of the user has touched the touch panel 31, the imaging controller 42 performs imaging for a still image by the imaging unit 100 in step #21 at the detection of the touch. That is, the light flux from the subject enters the imaging sensor 15 from the lens 11 through the diaphragm 12 and the shutter 14. The imaging sensor 15 converts the entered light flux to an electric signal. The electric signal output from the imaging sensor 15 is output by the imaging circuit 16 as an analog imaging signal. The analog imaging signal is converted to a digital imaging signal in a predetermined format by the A/D converter 17, and then sent to the image processor 18. For the digital imaging signal converted by the A/D converter 17, the image processor 18 performs predetermined image processing, for example, adjustments including a color correction, a gray scale correction, and a gamma (γ) correction of an image to be represented by the image data. The image processor 18 temporarily stores the image signal after the above adjustments in the buffer memory 19. The compressor/decompressor 21 compresses/decompresses the image signal temporarily stored in the buffer memory 19, forms the image signal into a format suitable for recording in the recording medium 22 to generate main image data as a still image shown in FIG. 16A, and records the main image data in the recording medium 22 via the interface 22a.

The system controller 26 then finishes the photography mode in step #22.

On the other hand, if judging in step #10 that the mode is not set to the touch autofocus (AF) mode, the system controller 26 shifts to step #30, and judges whether to continue the autofocusing (AF). If the system controller 26 judges to continue the focusing on the subject, the state of the release button 5 of the operation unit 27 shifts from an off-state to an on-state of a 1st release switch if the release button 5 is pressed halfway by the user in step #31.

In step #34, the system controller 26 finishes the autofocusing (AF), and judges in step #35 whether the state of the release button 5 shows an on-state of a 2nd release switch. If the state of the release button 5 is judged to be the on-state of the 2nd release switch, the imaging controller 42 causes the imaging unit 100 to perform an imaging operation for a still image of the subject in step #36. The system controller 26 displays the still image acquired by the imaging in the imaging controller 42 on the display screen of the LCD 9 in a magnified form.

If the autofocusing on the subject is finished as a result of the judgment of whether to continue the autofocusing (AF) on the subject, the system controller 26 shifts to step #32. If the release button 5 of the operation unit 27 is pressed halfway by the user, the state of the release button 5 shifts from an off-state to an on-state of the 1st release switch. The system controller 26 starts AF in step #33, finishes the autofocusing (AF) in step #34, and shifts to steps #35, #36, and #23.

Figure 10:
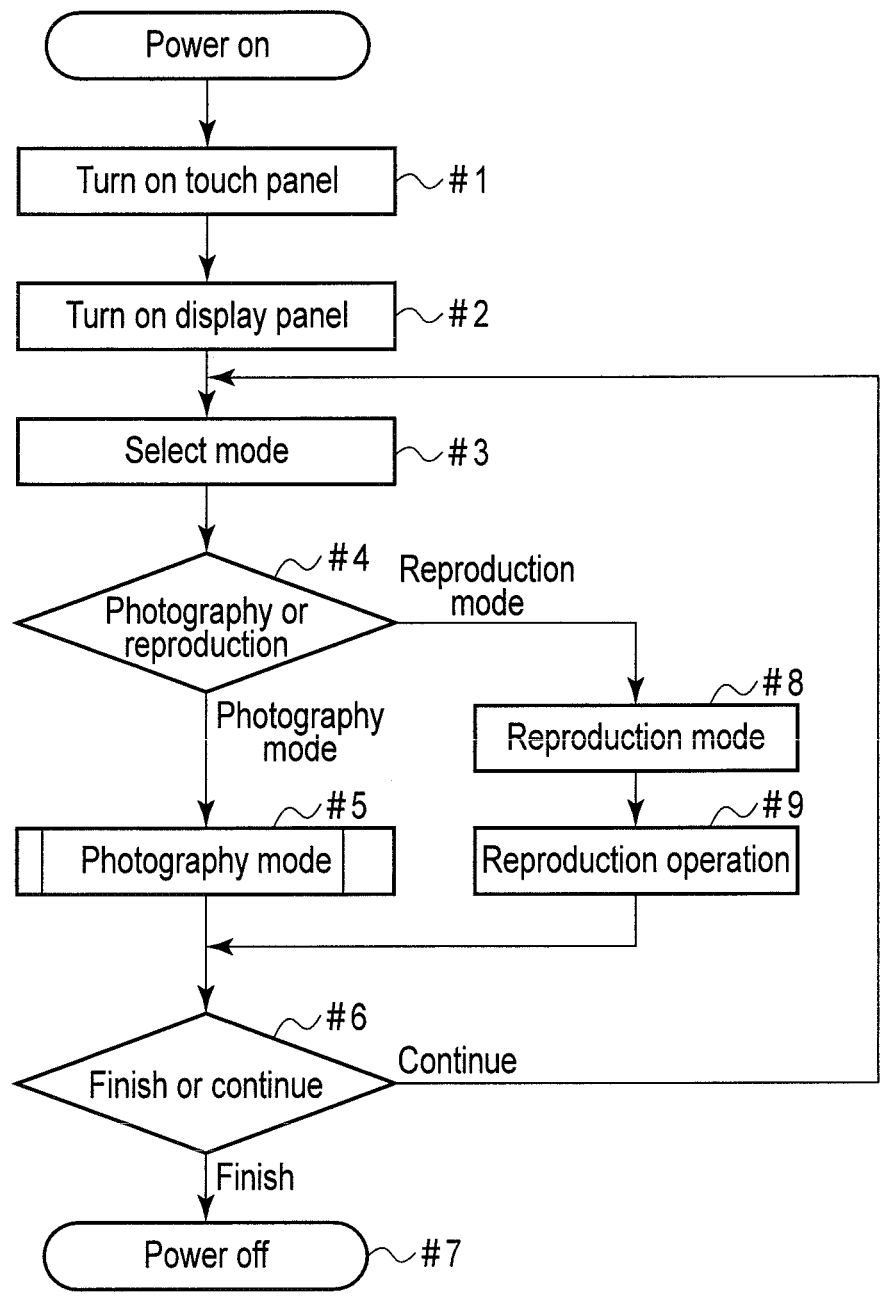
FIG. 10 is an imaging operation flowchart in a first imaging operation by the same apparatus.

Returning to the imaging operation flowchart shown in FIG. 10, the system controller 26 reads the states of the mode dial 6 and the end button in the operation unit 27 in step #6. If the mode is continuously set to the photography mode, the system controller 26 returns to step #3. If the end button is operated, the system controller 26 shifts to step #7 and then turns off the power.

On the other hand, if judging in step #4 that the mode is set to the reproduction mode, the system controller 26 shifts to step #8, and performs an operation in the reproduction mode. For example, in the reproduction mode, the list display unit 44 reads image data recorded in, for example, the recording medium 22, and displays a list of the image data on the display screen of the LCD 9 via the first liquid crystal controller 20.

If one item on the list of the image data displayed on the display screen of the LCD 9 by the list display unit 44 is selected, the image reproducer 45 only displays the selected image data on the display screen of the LCD 9 in a magnified form in step #9.

Thus, according to the first imaging operation described above, if the finger F of the user approaches the touch panel 31, the frame W for focus is displayed on the part of the display screen of the LCD 9 corresponding to the image part which the finger F of the user approaches, and autofocusing (AF) on the subject in the frame W for focus is performed. If the finger F of the user touches the touch panel 31 corresponding to the frame W for focus, an imaging operation is performed.

According to the first imaging operation described above, the frame W for focus is displayed in the image part on which autofocusing (AF) is to be performed, so that when the finger F of the user touches the touch panel 31 on the display screen of the LCD 9, the corresponding image to be touched by the finger F of the user is easily recognized, and imaging can be performed while the image in the part on which autofocusing (AF) is to be performed is checked.

If the frame W for focus is displayed when the finger F of the user is approaching the touch panel 31, the part of the touch panel 31 to be touched by the finger F of the user can be checked on the display screen of the LCD 9 without being hidden by the finger F of the user before the finger F of the user touches the touch panel 31. If it is found out from the check that the region to be touched by the finger F of the user is different from the region desired by the user, the region to be touched by the finger F of the user can be changed.

The subject corresponding to the coordinate position of the candidate point P can be focused before the finger F of the user touches the touch panel 31. Therefore, the time before focusing can be shorter than when focusing is performed after the finger F of the user has touched the touch panel 31.

[Second Imaging Operation]

Now, a second imaging operation is described with reference to an imaging operation flowchart shown in FIG. 17. FIG. 18 shows an imaging operation timing chart. In the same manner as FIG. 12, FIG. 18 shows a period in which a capacitance value generated between the touch panel 31 and, for example, the finger F of the user can be sensed, a display period of the frame W for focus displayed on the display screen of the LCD 9, a period in which autofocusing (AF) is performed, and a period in which imaging is performed. The same parts as those in the above first imaging operation are indicated by the same reference signs and are not described in detail.

In the case of the second imaging operation, the finger F of the user moves in a horizontal direction, that is, in a planar direction parallel with the display screen of the LCD 9 so that the finger F of the user is close to the touch panel 31 and, for example, the finger F of the user is within the second touch approach range E2 relative to the touch panel 31.

In this second imaging operation, the touch panel controller 30 judges in step #20 whether the finger F of the user has touched the touch panel 31 corresponding to, for example, the facial part S of the person to be focused in the subject in the frame W for focus as shown in FIG. 16B.

If it is judged that the finger F of the user has not touched the touch panel 31, the frame display controller 40 shifts to step #40, and judges whether the finger F of the user has moved in the planar direction parallel with the display surface of the LCD 9 as shown in FIG. 8 so that the finger F of the user is close to the touch panel 31, that is, the finger F of the user is present in the second touch approach range E2 shown in FIG. 4. The touch panel controller 30 judges from the capacitance value in the touch panel 31 whether the finger F of the user is present in the second touch approach range E2, as described above.

According to the judgment of the movement of the finger F of the user, if the finger F of the user approaches the display surface of the touch panel 31 and enters the second touch approach range E2, the capacitance value increases on the touch panel 31, and there are more places where, for example, the numerical values "5", "3" and "1" appear, as shown in FIG. 6C. The touch panel controller 30 finds, as the coordinate position of the finger F of the user, a place where the greatest change in capacitance value is shown among the numerical values "5", "3" and "1", for example, the place having the numerical value "5".

Figure 19A:
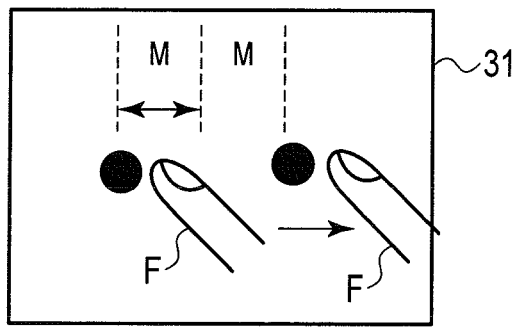
FIG. 19A is a diagram illustrating the tracking of the frame for focus during the movement of the finger of the user in the same apparatus.

If the finger F of the user moves in the planar direction parallel with the display surface of the touch panel 31 above the touch panel 31 as shown in FIG. 19A, the part in which the capacitance value on the touch panel 31 increases moves in accordance with the movement of the finger F of the user. The touch panel controller 30 tracks the movement of the coordinate position of the finger F of the user where the greatest change in capacitance value is shown. As a result of this track, the touch panel controller 30 follows the movement of the finger F of the user, and sends, to the frame display controller 40, each of the coordinate positions where the finger F of the user moves. The frame W for focus is moved by the movement of the finger F of the user to follow the movement of the facial part S of the person when the facial part S of the person in the image displayed on the display screen of the LCD 9 moves.

The frame display controller 40 sequentially receives each of the coordinate positions of the movement of the finger F of the user found by the touch panel controller 30, and judges whether the finger F of the user has moved a predetermined movement distance M, for example, 10 mm or more from each of the coordinate positions.

Figure 19B:
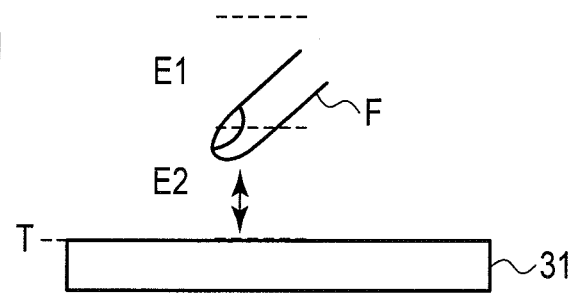
FIG. 19B is a diagram illustrating the tracking of the frame for focus during the movement of the finger of the user in the same apparatus.

If judging that the movement distance of the finger F of the user is, for example, 10 mm or more, the frame display controller 40 judges, in step #41, the direction in which the finger F of the user moves in accordance with each of the coordinate positions of the movement of the finger F of the user sequentially received from the touch panel controller 30. The frame display controller 40 moves the frame W for focus on the display screen of the LCD 9, for example, as shown in FIG. 8 in the movement direction of the finger F of the user by a movement distance 2M such as 20 mm which is twice the predetermined movement distance M as shown in FIG. 19A and FIG. 19B.

If moving the frame W for focus on the display screen of the LCD 9 in accordance with the movement of the finger F of the user, the frame display controller 40 moves the frame W for focus at a speed proportionate to the speed at which the finger F of the user moves.

During the movement of the frame W for focus, the focus controller 41 does not perform focusing on the subject, and stops focusing.

Figure 20A:
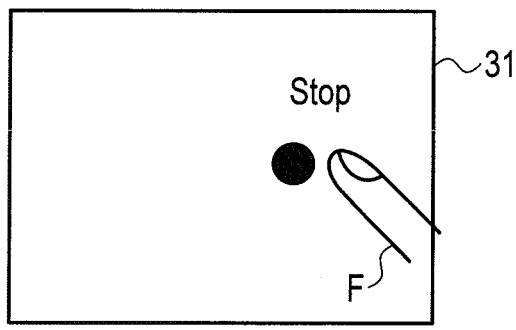
FIG. 20A is a diagram showing that the movement of the finger of the user is stopped for a given period of time in the same apparatus.
Figure 20B:
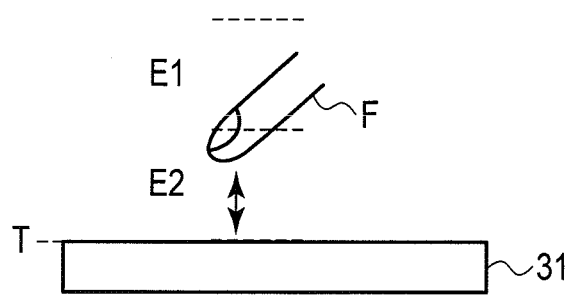
FIG. 20B is a diagram showing that the movement of the finger of the user is stopped for a given period of time in the same apparatus.
Figure 20C:
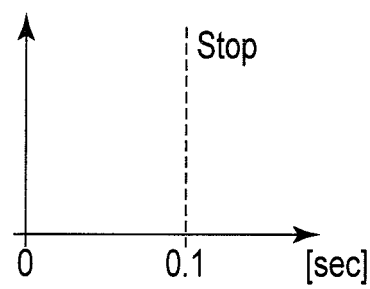
FIG. 20C is a diagram showing that the movement of the finger of the user is stopped for a given period of time in the same apparatus.

In step #42, the frame display controller 40 judges whether the finger F of the user stops moving at one place as shown in FIG. 20A, FIG. 20B, and FIG. 20C and stays stopped for a given period of time. If judging that the finger F of the user is moving, the frame display controller 40 returns to step #41, and moves the frame W for focus on the display screen of the LCD 9 in accordance with each of the coordinate positions of the movement of the finger F of the user.

If the finger F of the user stops moving for a given period of time, the frame display controller 40 sends, to the focus controller 41, a message that the movement of the finger F of the user has stopped. In response to the message that the movement of the finger F of the user has stopped, the focus controller 41 starts autofocusing (AF) on the subject in the frame W for focus.

In step #20, the touch panel controller 30 again judges whether the finger F of the user has touched the touch panel 31 corresponding to, for example, the facial part S of the person to be focused in the subject in the frame W for focus as shown in FIG. 16B. If judging that the finger F of the user has touched the touch panel 31 in the subject in the frame W for focus, the touch panel controller 30 judges from the capacitance value in the touch panel 31 that the finger F of the user has touched the touch panel 31, and sends the relevant message to the imaging controller 42. On receipt of the message from the touch panel controller 30 that the finger F of the user has touched the touch panel 31, the imaging controller 42 performs imaging for a still image by the imaging unit 100 in step #21 at the detection of the touch. The system controller 26 displays the still image acquired by the imaging in the imaging unit 100 on the display screen of the LCD 9 in a magnified form.

Thus, according to the second imaging operation described above, if the finger F of the user is moved in the horizontal direction so that the finger F of the user is close to the touch panel 31 and, for example, the finger F of the user is within the second touch approach range E2 relative to the touch panel 31, the frame W for focus is moved in accordance with the movement of the finger F of the user. If the finger F of the user then stops moving for a given period of time, autofocusing (AF) on the subject in the frame W for focus is resumed, and imaging is performed when the finger F of the user touches the touch panel 31.

Consequently, it is possible to provide advantageous effects similar to the advantageous effects in the first imaging operation. In addition, even if the finger F of the user moves, the frame W for focus can be moved in accordance with the movement of the finger F of the user. For example, even if the facial part S of the person has moved on the display screen of the LCD 9, the frame W for focus can be moved in accordance with the movement of the facial part S of the person by moving the finger F of the user to follow the movement of the facial part S. Imaging can be then performed by the autofocusing on the facial part S of the person in the frame W for focus. During the movement of the frame W for focus, autofocusing (AF) on the facial part S of the person in the frame W for focus is not performed. Therefore, the autofocusing (AF) is not performed when focusing is unnecessary, so that no wasteful operation is performed. Even when the facial part S of the person which is the main subject is changed to a facial part S of a different person, the frame W for focus can be displayed in the image part to be touched if the finger F of the user is moved closer to touch the part of the touch panel 31 corresponding to the facial part S of the different person.

[Third Imaging Operation]

Now, a third imaging operation is described with reference to the imaging operation flowchart shown in FIG. 17 and with reference to a frame magnification/demagnification display flowchart in an imaging operation shown in FIG. 21. FIG. 22 shows an imaging operation timing chart. In the same manner as FIG. 12, FIG. 22 shows a period in which a capacitance value generated between the touch panel 31 and, for example, the finger F of the user can be sensed, a display period of the frame W for focus displayed on the display screen of the LCD 9, a period in which autofocusing (AF) is performed, and a period in which imaging is performed. The same parts as those in the above second imaging operation are indicated by the same reference signs and are not described in detail.

In the third imaging operation, the finger F of the user approaches the touch panel 31 from an inclined direction. The touch panel controller 30 finds the position of the finger F of the user approaching the touch panel 31 as shown in FIG. 5 in accordance with the inclination angle θ, and displays the frame W for focus on the display screen of the LCD 9 corresponding to the position of the finger F of the user.

The frame display controller 40 sequentially demagnifies the size of the frame W for focus whenever the finger F of the user approaches the touch panel 31. As the sizes of the frame W for focus, the frame display controller 40 includes sizes such as an extra-large size WE, a large size WL, a middle size WM, and a small size WS. The frame display controller 40 divides the second touch approach range E2 into, for example, four size ranges, and sets the size of the frame W for focus to the extra-large size WE, the large size WL, the middle size WM, and the small size WS in descending order of distance from the touch panel 31.

FIG. 23 shows a schematic diagram of the size ranges for changing the size of the frame for focus. The second touch approach range E2 is separated into size ranges such as first to fourth size ranges E10 to E13. The first to fourth size ranges E10 to E13 are separated by capacitance values Tha, Thb, and Thc between the touch panel 31 and the finger F of the user. The relation of magnitude between the capacitance values Tha, Thb, and Thc is Tha<Thb<Thc. The first size range E10 is between the capacitance values Th2 and Tha. The second size range E11 is between the capacitance values Tha and Thb. The third size range E12 is between the capacitance values Thb and Thc. The fourth size range E13 is between the capacitance values Thc and Th3.

Therefore, if the finger F of the user approaches the touch panel 31 and then sequentially enters the first to fourth size ranges E10 to E13 of the second touch approach range E2, the frame display controller 40 changes the size of the frame W for focus in the order of the extra-large size WE, the large size WL, the middle size WM, and the small size WS. As a result of this size change, the size of the frame W for focus is sequentially demagnified.

If the finger F of the user moves away from the touch panel 31 and enters, for example, the fourth to first size ranges E13 to E10, the frame display controller 40 changes the size of the frame W for focus in the order of the small size WS, the middle size WM, the large size WL, and the extra-large size WE. As a result of this size change, the size of the frame W for focus is sequentially magnified.

In this third imaging operation, the finger F of the user is approaching to touch the touch panel 31 in the inclined direction in the photography mode.

FIG. 24A and FIG. 24B show the situation in which the finger F of the user is about to touch the touch panel 31 in an inclined direction. FIG. 24A shows the image displayed on the LCD 9 in the above situation. FIG. 24B schematically shows the finger F of the user about to touch in the inclined direction in the above situation.

Figure 26A:
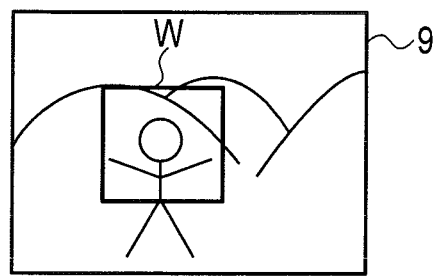
FIG. 26A is a diagram showing a displayed image in the same apparatus.
Figure 26B:
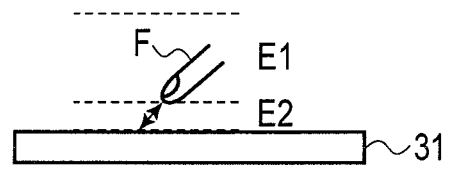
FIG. 26B is a diagram showing the position of the finger of the user in the situation in which the finger of the user has approached and entered the second approach range in the inclined direction relative to the touch panel in the same apparatus.
Figure 27A:
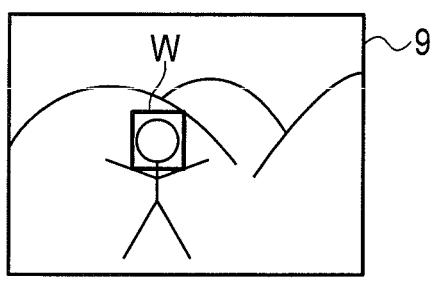
FIG. 27A is a diagram showing a displayed image in the same apparatus.
Figure 27B:
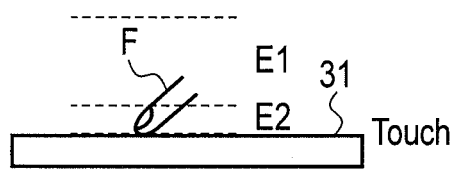
FIG. 27B is a diagram showing the position of the finger of the user in the situation in which the finger of the user has touched the touch panel in the same apparatus.

If the finger F of the user moves in the inclined direction as shown in FIG. 24B and FIG. 25B and enters the second touch approach range E2 through the first touch approach range E1, the touch panel controller 30 finds the coordinate position of the finger F of the user projected on the touch panel 31 as shown in FIG. 5 in step #14. At the same time, in step #16, the touch panel controller 30 sends, to the frame display controller 40, a message that the finger F of the user has entered the second touch approach range E2. On receipt of the message that the finger F of the user has entered the second touch approach range E2, the frame display controller 40 displays the frame W for focus on the LCD 9 as shown in FIG. 26A.

Figure 21:
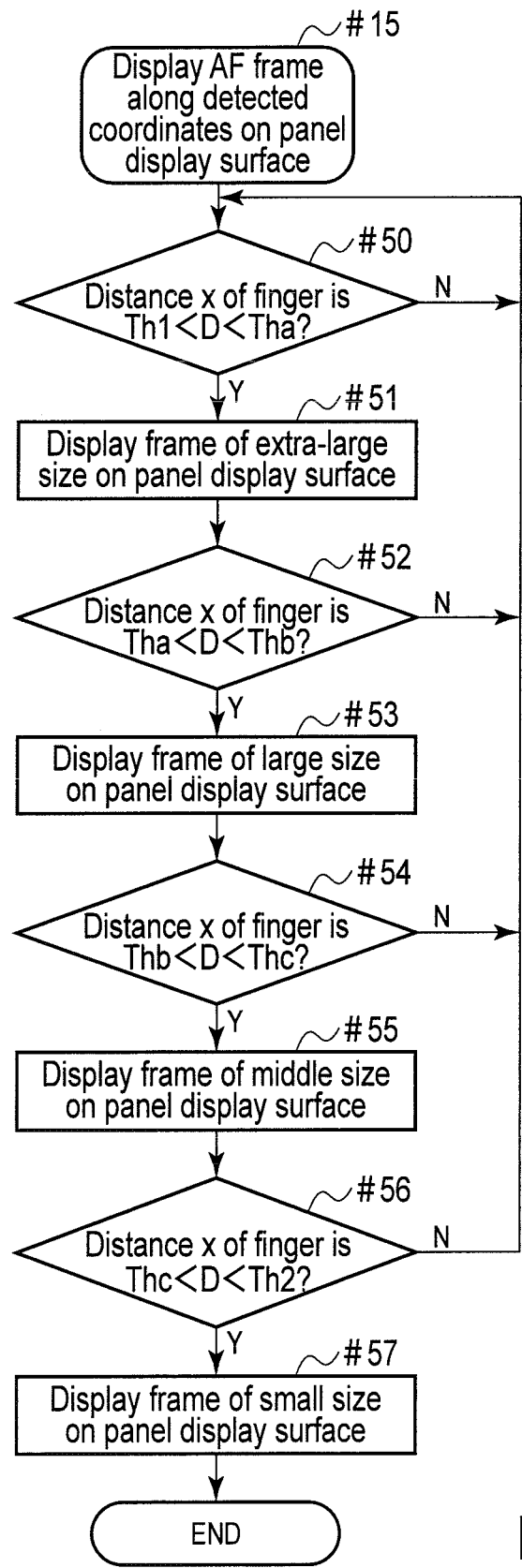
FIG. 21 is a frame magnification/demagnification display flowchart in an imaging operation in the same apparatus.
Figure 22:
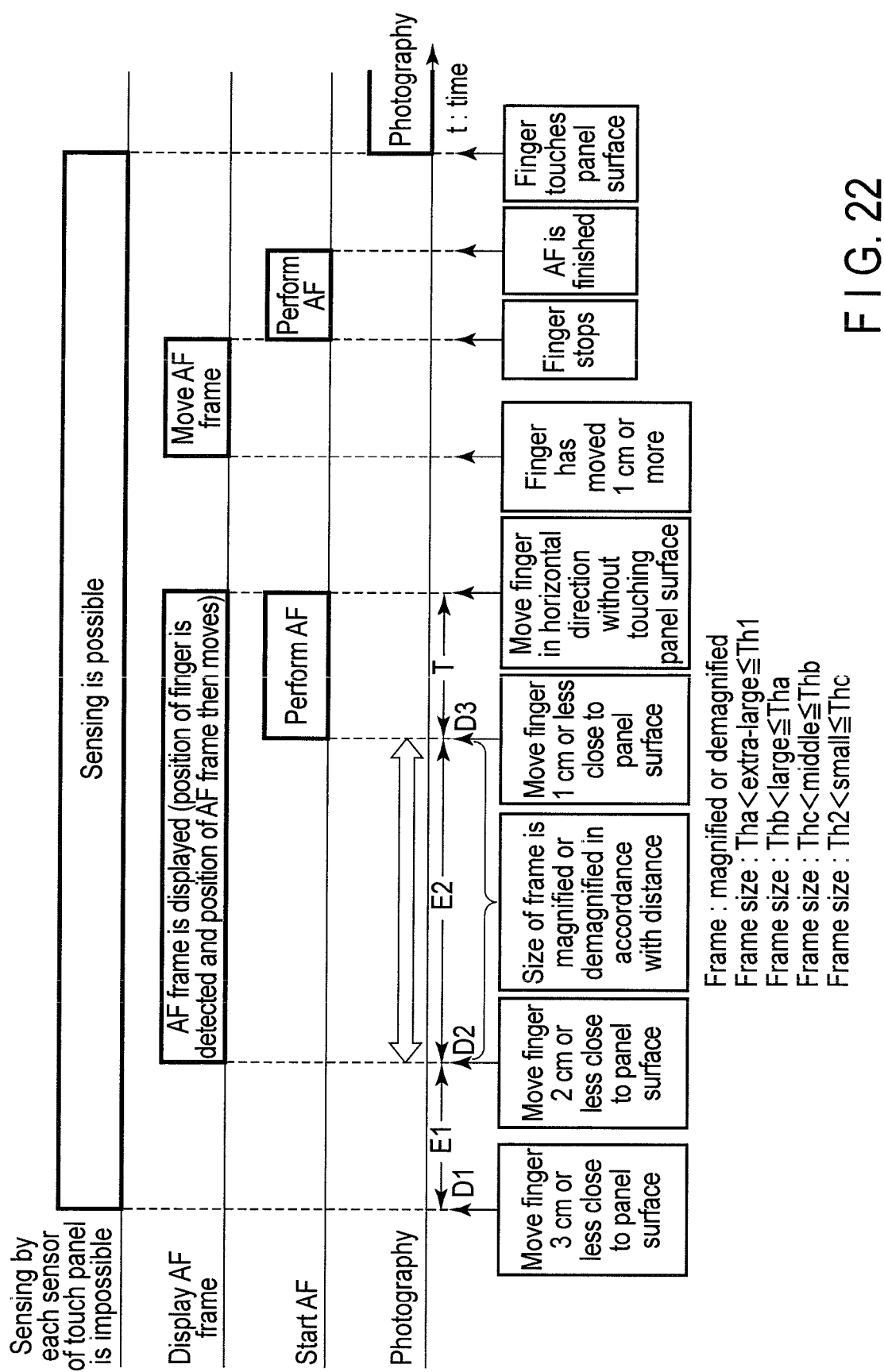
FIG. 22 is an imaging operation timing chart in a third imaging operation in the same apparatus.

From this point, the frame display controller 40 sequentially demagnifies the size of the frame W for focus in accordance with the frame magnification/demagnification display flowchart in an imaging operation shown in FIG. 21 whenever the finger F of the user approaches the touch panel 31. That is, if the finger F of the user enters the second touch approach range E2 as shown in FIG. 23, the frame display controller 40 judges, in step #50, whether the finger F of the user is in the first size range E10. This judgment is made by whether the capacitance value between the touch panel 31 and the finger F of the user is between Th2 and Tha.

If judging that the capacitance value between the touch panel 31 and the finger F of the user is between Th2 and Tha, the frame display controller 40 displays the frame W for focus having the extra-large size WE on the LCD 9 in step #51.

In step #52, the frame display controller 40 judges whether the finger F of the user is in the second size range E11. This judgment is made by whether the capacitance value between the touch panel 31 and the finger F of the user is between Tha and Thb.

If judging that the capacitance value between the touch panel 31 and the finger F of the user is between Tha and Thb, the frame display controller 40 displays the frame W for focus having the large size WL on the LCD 9 in step #53.

In step #54, the frame display controller 40 judges whether the finger F of the user is in the third size range E12. This judgment is made by whether the capacitance value between the touch panel 31 and the finger F of the user is between Thb and Thc.

If judging that the capacitance value between the touch panel 31 and the finger F of the user is between Thb and Thc, the frame display controller 40 displays the frame W for focus having the middle size WM on the LCD 9 in step #55.

In step #56, the frame display controller 40 judges whether the finger F of the user is in the fourth size range E13. This judgment is made by whether the capacitance value between the touch panel 31 and the finger F of the user is between Thc and Th3.

If judging that the capacitance value between the touch panel 31 and the finger F of the user is between Thc and Th3, the frame display controller 40 displays the frame W for focus having the small size WS on the LCD 9 in step #57.

Therefore, if the finger F of the user approaches the touch panel 31 and then sequentially enters the first to fourth size ranges E10 to E13 of the second touch approach range E2, the frame display controller 40 changes and demagnifies the size of the frame W for focus in the order of the extra-large size WE, the large size WL, the middle size WM, and the small size WS.

The touch panel controller 30 then shifts to step #17 in the same manner as described above.

Thus, according to the third imaging operation described above, when the finger F of the user approaches the touch panel 31 from the inclined direction, the position of the finger F of the user approaching the touch panel 31 is found in accordance with the inclination angle θ, and the frame W for focus is displayed on the display screen of the LCD 9 corresponding to the position of the finger F of the user. As a result, the finger F of the user can approach the touch panel 31 from the inclined direction. Consequently, the frame W for focus is not hidden by the finger F of the user, and it is possible to touch within the frame W for focus with a certain recognition of the display position of the frame W for focus, and perform imaging while checking the image in the part on which autofocusing (AF) is to be performed.

The size of the frame W for focus is demagnified in the order of, for example, the extra-large size WE, the large size WL, the middle size WM, and the small size WS whenever the finger F of the user approaches the touch panel 31. Therefore, as the finger F of the user approaches the touch panel 31, the part of the touch panel 31 to be touched by the finger F of the user can be checked on the display screen of the LCD 9 before the finger F of the user touches the touch panel 31. Moreover, operation is easier when the finger F of the user touches within the frame W for focus, and the timing in which the finger F of the user touches the touch panel 31 is more easily known, so that operability during imaging can be improved.

[Fourth Imaging Operation]

In a fourth imaging operation, a first movement speed ΔP1 and a second movement speed ΔP2 are set in the touch panel controller 30 to judge a variation ΔP in the movement speed of the position where the finger F of the user touches the touch panel 31. The first and second movement speeds ΔP1 and ΔP2 are set in the relation ΔP1>ΔP2.

The touch panel controller 30 judges whether the variation ΔP in the movement speed of the position where the finger F of the user touches the touch panel 31 is lower than the preset first movement speed ΔP1, or between the preset movement speeds ΔP1 and ΔP2, or lower than the movement speed ΔP2.

The touch panel controller 30 not only judges the variation ΔP in the movement speed of the position where the finger F of the user touches the touch panel 31 but may also judge the variation ΔP in the movement speed of the finger F of the user while the finger F of the user is close to the first and second touch approach ranges E1 and E2 as shown in FIG. 4 and FIG. 5.

The frame display controller 40 includes the frames W for focus of sizes corresponding to the variation ΔP in the movement speed of the touch position of the finger F of the user. For example, the frames W for focus include a first size corresponding to one divisional region of 9 divisions of the display screen of the LCD 9, a second size corresponding to one divisional region of 18 divisions of the display screen of the LCD 9, and a third size corresponding to one divisional region of 27 divisions of the display screen of the LCD 9. Regarding the relation between the sizes of the frames W for focus, the first size is the largest, the second size is the second largest, and the third size is the third largest. The sizes of the frames W for focus are not limited to the first to third sizes and may be changed. For example, other sizes may be set, or there may be additional kinds of sizes.

If the variation ΔP in the movement speed of the touch position of the finger F of the user, for example, the variation ΔP in the movement speed of the touch position of the finger F of the user is higher than the preset movement speed ΔP1, the frame display controller 40 displays the frame W for focus having the first size on the display screen of the LCD 9.

If the variation ΔP in the movement speed of the touch position of the finger F of the user is between the preset movement speeds ΔP1 and ΔP2, the frame display controller 40 displays the frame W for focus having the second size on the display screen of the LCD 9.

If the variation ΔP in the movement speed of the touch position of the finger F of the user is lower than the preset movement speed ΔP2, the frame display controller 40 displays the frame W for focus having the third size on the display screen of the LCD 9.

Figure 28:
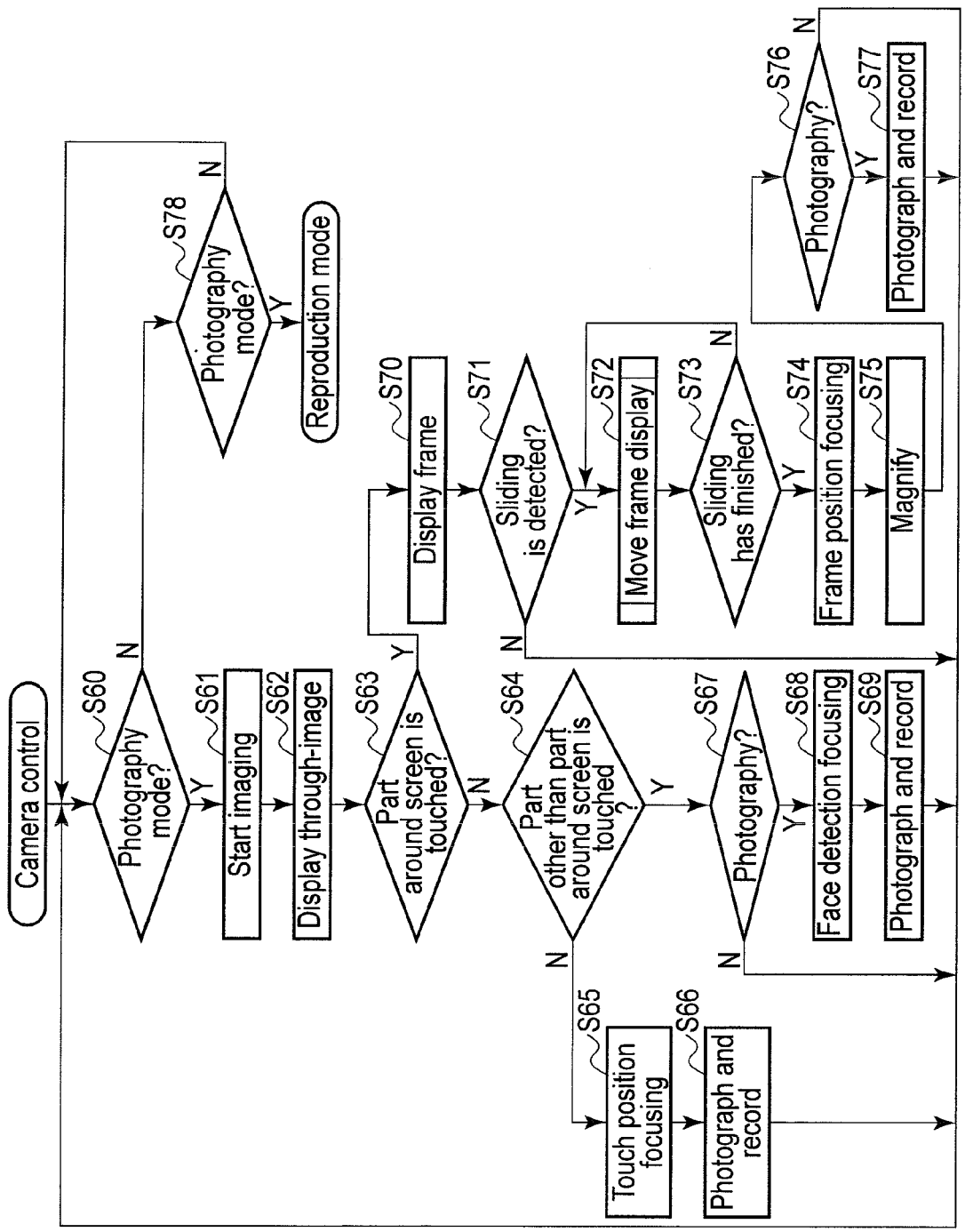
FIG. 28 is an imaging operation flowchart in a fourth imaging operation by the same apparatus.

Now, the fourth imaging operation is described with reference to an imaging operation flowchart shown in FIG. 28.

In step #60, the system controller 26 judges whether the mode selected by, for example, the user operation on the mode dial 6 is the photography mode. If judging that the mode is the photography mode, the system controller 26 starts a photography operation in step #61, controls a series of imaging operations for imaging the subject, and live-view-displays a through-image on the LCD 9 in step #62.

In step #63, the touch panel controller 30 monitors a change in capacitance value in the touch panel 31. The touch panel controller 30 judges whether the monitored capacitance value has reached the just-before-touch range T and the finger F of the user has touched the touch panel 31. If the finger F of the user touches the touch panel 31, the touch panel controller 30 also detects a coordinate position of the touched region, and judges whether this coordinate position is a peripheral part on the display screen of the LCD 9. The coordinate position of the peripheral part on the display screen of the LCD 9 is preset.

If judging that the coordinate position touched by the finger F of the user is not the peripheral part on the display screen of the LCD 9, the touch panel controller 30 judges in step #64 whether the coordinate position touched by the finger F of the user is a part other than the peripheral part on the display screen of the LCD 9.

If judging that the coordinate position touched by the finger F of the user is a part other than the peripheral part on the display screen of the LCD 9, the focus controller 41 starts autofocusing (AF) on the subject on the image corresponding to the coordinate position touched by the finger F of the user.

If the autofocusing (AF) is finished and the release button 5 shifts from the on-state of the 1st release switch to the on-state of the 2nd release switch, the imaging controller 42 performs imaging for a still image by the imaging unit 100 in step #66. The imaging controller 42 records main image data acquired by the imaging in the recording medium 22 via the interface 22*a*.

If it is judged in step #64 that the coordinate position touched by the finger F of the user is not a part other than the peripheral part on the display screen of the LCD 9, the imaging controller 42 judges in step #67 whether the release button 5 has shifted from the on-state of the 1st release switch to the on-state of the 2nd release switch and whether to perform an imaging operation. If judging that the imaging operation is performed, the imaging controller 42 sends a face detection instruction to the face detector 43 in step #68. The face detector 43 detects the facial part S of the subject present in the image data.

If the facial part S of the subject is detected and the release button 5 shifts from the on-state of the 1st release switch to the on-state of the 2nd release switch, the imaging controller 42 performs imaging for a still image by the imaging unit 100, and records main image data acquired by the imaging in the recording medium 22 via the interface 22*a* in step #69.

On the other hand, if it is judged in step #63 that the coordinate position touched by the finger F of the user is not the peripheral part on the display screen of the LCD 9, the touch panel controller 30 sends, to the frame display controller 40, a message that the coordinate position touched by the finger F of the user is not the peripheral part on the display screen of the LCD 9, and the coordinate position touched by the finger F of the user.

In step #70, the frame display controller 40 displays the frame W for focus on the LCD 9 in the peripheral part on the display screen of the LCD 9 and at a position corresponding to the coordinate position touched by the finger F of the user as shown in FIG. 29A. The frame W for focus is displayed in the peripheral part on the display screen of the LCD 9 because when a person is imaged as a subject, the person is generally located in the center of the display screen of the LCD 9, so that the composition for imaging the subject is not affected by the peripheral part of the display screen if the frame W for focus is displayed in the peripheral part.

Here, the user moves the frame W for focus on the display screen of the LCD 9 while touching the frame W for focus, and sets the frame W for focus on the facial part S of the subject.

In step #71, the frame display controller 40 judges whether the finger F of the user has moved as shown in FIG. 29B. If judging that the finger F of the user has moved, the frame display controller 40 moves the frame W for focus on the display screen of the LCD 9 in accordance with the movement of the finger F of the user in step #72. If moving the frame W for focus in accordance with the movement of the finger F of the user, the frame display controller 40 moves the frame W for focus so that the speed and direction of the movement correspond to the speed and direction of the movement of the finger F of the user.

In step #73, the frame display controller 40 judges whether the movement of the finger F of the user has finished. If the movement has not finished, the frame display controller 40 continues the display of the frame W for focus in accordance with the movement of the finger F of the user.

Figure 30:
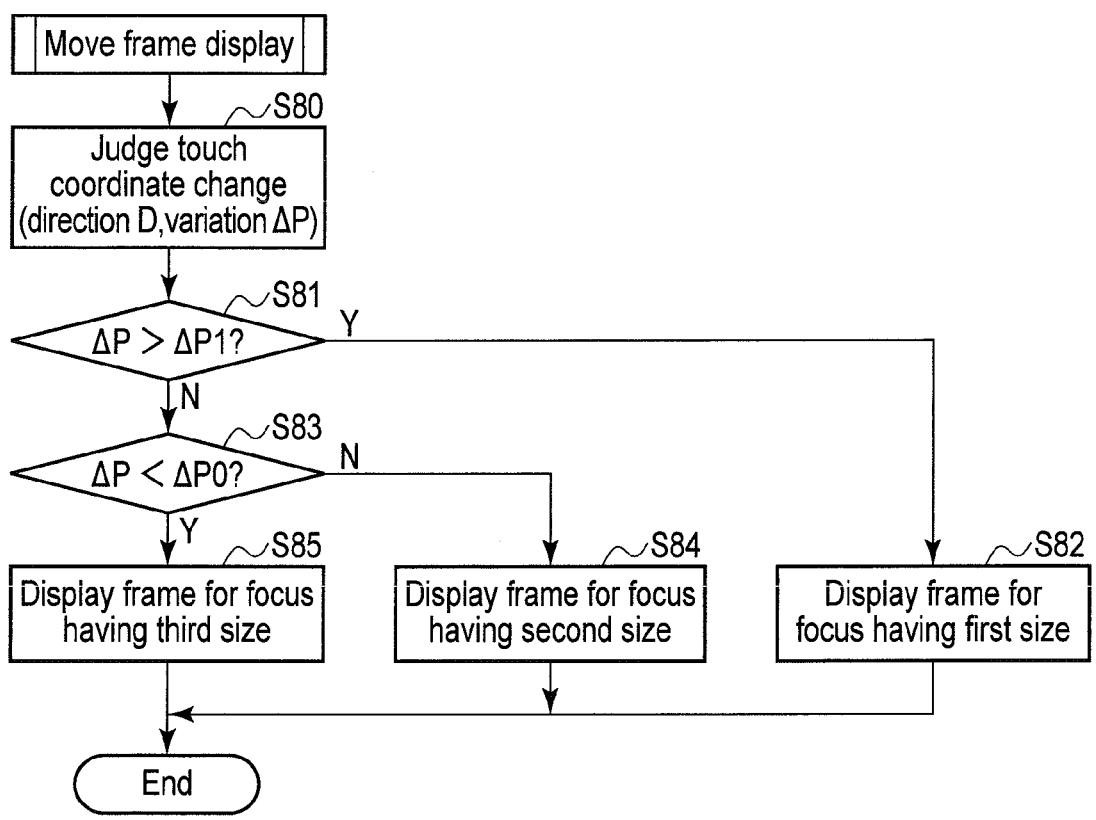
FIG. 30 is a movement flowchart of the frame for focus in the same apparatus.

FIG. 30 shows a frame display movement flowchart of the frame W for focus.

In step #80, the touch panel controller 30 judges the change of the coordinate position touched by the finger F of the user. That is, the touch panel controller 30 detects a coordinate position of a place having a great change in capacitance value on the touch panel 31, sequentially detects coordinate positions of places having a great change in capacitance value which move with the elapse of time, and from each of the coordinate positions, detects the movement of the coordinate position on the touch panel 31 touched by the finger F of the user. When moving the frame W for focus in accordance with the movement on the touch panel 31 touched by the finger F of the user, the frame display controller 40 moves the frame W for focus so that the speed and direction of the movement correspond to the speed and direction of the movement of the touch position of the finger F of the user. Here, a variation in the movement speed of the touch position of the finger F of the user is $\Delta P$, and the direction of the movement is D.

In step #81, the touch panel controller 30 judges whether the variation $\Delta P$ in the movement speed of the touch position of the finger F of the user is higher than the preset movement speed $\Delta P1$ ($\Delta P > \Delta P1$). In step #82, the touch panel controller 30 judges whether the variation $\Delta P$ in the movement speed of the touch position of the finger F of the user is higher than the preset movement speed $\Delta P2$ ($\Delta P > \Delta P2$).

If it is found out from each judgment that the variation $\Delta P$ in the movement speed of the touch position of the finger F of the user, for example, the variation $\Delta P$ in the movement speed of the touch position of the finger F of the user is higher than the preset movement speed $\Delta P1$, the frame display controller 40 displays the frame W for focus having the first size on the display screen of the LCD 9 in step #82.

If the variation $\Delta P$ in the movement speed of the touch position of the finger F of the user is between the preset movement speeds $\Delta P1$ and $\Delta P2$, the frame display controller 40 displays the frame W for focus having the second size on the display screen of the LCD 9 in step #84.

If the variation $\Delta P$ in the movement speed of the touch position of the finger F of the user is lower than the preset movement speed $\Delta P2$, the frame display controller 40 displays the frame W for focus having the third size on the display screen of the LCD 9 in step #85.

If the finger F of the user touches the peripheral part on the display screen of the LCD 9 to display the frame W for focus and adjust the frame W for focus to the facial part S of the person which is the subject as shown in FIG. 29A, FIG. 29B, and FIG. 29C, the movement speed of the finger F of the user is higher at the start of the movement, and becomes lower when the facial part S is closer. The variation $\Delta P$ in the movement speed of the touch position of the finger F of the user is, for example, $\Delta P > \Delta P1$ at the start of the movement, and then becomes $\Delta P1 > \Delta P > \Delta P2$, and becomes $\Delta P2 > \Delta P$ when the frame W for focus is adjusted to the facial part S of the person.

The frame display controller 40 first displays the frame W for focus having the first size on the display screen of the LCD 9, and then displays the frame W for focus having the second size on the display screen of the LCD 9, and then displays the frame W for focus having the third size on the display screen of the LCD 9.

In step #73, the frame display controller 40 judges whether the variation $\Delta P$ in the movement speed of the touch position of the finger F of the user is no longer found and the movement of the frame W for focus having the third size has finished.

If it is judged that the movement of the frame W for focus having the third size has finished, the focus controller 41 starts autofocusing (AF) on the subject on the image corresponding to the frame W for focus having the third size.

If the autofocusing (AF) is finished, the imaging controller 42 magnifies a through-image of the moving images of the subject corresponding to the frame W for focus having the third size, and live-view-displays a magnified through-image K on the LCD 9 in step #75. The imaging controller 42 displays the magnified through-image K in the frame W for focus having the third size as, for example, a subject in the display screen of the LCD 9 in a region that does not overlap the person.

If the release button 5 shifts from the on-state of the 1st release switch to the on-state of the 2nd release switch, the imaging controller 42 performs imaging for a still image by the imaging unit 100 in step #76. The imaging controller 42 records image data acquired by the imaging in the recording medium 22 via the interface 22a in step #77. The system controller 26 displays the still image acquired by the imaging in the imaging unit 100 on the display screen of the LCD 9 in a magnified form.

Thus, according to the fourth imaging operation described above, it is judged whether the variation $\Delta P$ in the movement speed of the touch position of the finger F of the user is higher than the preset movement speed $\Delta P1$, or between the preset movement speeds $\Delta P1$ and $\Delta P2$, or lower than the movement speed $\Delta P2$. If it is judged that the variation $\Delta P$ in the movement speed of the touch position of the finger F of the user is higher than the preset movement speed $\Delta P1$, the frame W for focus having the first size is displayed. If the variation $\Delta P$ in the movement speed of the touch position of the finger F of the user is between the preset movement speeds $\Delta P1$ and $\Delta P2$, the frame W for focus having the second size is displayed. If the variation $\Delta P$ in the movement speed of the touch position of the finger F of the user is lower than the preset movement speed $\Delta P2$, the frame W for focus having the third size is displayed.

Thus, at the beginning of the movement of the frame W for focus, the frame W for focus having the first size is displayed and is more easily positioned relative to the facial part S of the person which is the subject. As the frame W for focus approaches the facial part S, the movement speed of the finger F of the user becomes lower, the display is switched from the frame W for focus having the second size to the frame W for focus having the third size, and the frame W for focus can be accurately positioned in accordance with the facial part S.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
 a display unit which displays a moving image or a still image;
 a touch panel provided in the display unit;
 a frame display controller which displays a frame for focus on the display unit if an operation portion approaches the touch panel, and moves the frame for focus in accordance with the movement of the operation portion that approaches the touch panel;
 an imaging controller which performs focusing on a subject is located in the frame for focus and then performs imaging in response to a photography instruction;
 an imaging unit which images the subject;
 a touch panel controller which judges whether the operation portion approaches the touch panel or has contacted the touch panel; and
 a focus controller which performs focusing on the subject in the frame for focus, wherein the display unit displays the moving image or the still image obtained by the imaging unit, wherein the frame display controller displays the frame for focus on the display unit and moves the frame for focus in accordance with the movement of the operation portion in a situation in which the operation portion is approaching the touch panel, wherein the imaging controller performs imaging by use of the imaging unit, wherein the touch panel controller presets touch approach ranges corresponding to the distances at which the operation portion approaches the touch panel, and judges which of the touch approach ranges the operation portion is in, wherein the frame display controller displays the frame for focus on the display screen of the display unit if the touch panel controller judges that the operation portion enters the touch approach range which is far from the touch panel among the touch approach ranges for the touch panel, and wherein the focus controller performs the focusing on the subject if the operation portion enters one of the touch approach ranges which is near the touch panel among the touch approach ranges for the touch panel.

2. The imaging apparatus according to claim 1,
wherein the display unit includes a display screen,
the touch panel is provided on the display screen, and
the frame display controller displays the frame for focus at a coordinate position corresponding to a part where the operation portion approaches the touch panel on the display screen of the display unit.

3. The imaging apparatus according to claim 2,
if the operation portion approaches and contacts the touch panel from an inclined direction,
the frame display controller finds the position of the part where the operation portion is about to touch the touch panel in accordance with the inclination angle and displays the frame for focus on the display screen corresponding to the position of this part.

4. The imaging apparatus according to claim 1,
wherein the frame display controller moves the frame for focus on the display screen of the display unit in accordance with the movement of the approaching operation portion.

5. The imaging apparatus according to claim 4,
wherein the frame display controller moves the frame for focus at a speed corresponding to the movement speed of the operation portion and in a direction corresponding to the movement direction of the operation portion.

6. The imaging apparatus according to claim 5,
wherein the frame display controller demagnifies or magnifies the size of the frame for focus in accordance with the distance between the operation portion and the touch panel.

7. The imaging apparatus according to claim 6,
wherein the frame display controller demagnifies the size of the frame for focus as the distance between the operation portion and the touch panel decreases.

8. The imaging apparatus according to claim 1,
wherein the focus controller does not perform the focusing while the frame for focus is being moved by the frame display controller, and the focus controller performs the focusing on the subject if the operation portion stops.

9. The imaging apparatus according to claim 1,
wherein the imaging controller performs an imaging operation for the subject by use of the imaging unit at the detection of the contact if detecting that the operation portion has contacted the touch panel.

10. The imaging apparatus according to claim 1, further comprising
a face detector which detects whether a facial part of the subject is present in the frame for focus,
wherein the frame display controller corrects the display position of the frame for focus to the facial part detected by the face detector.

11. An imaging apparatus comprising:
a display unit which displays a moving image or a still image;
a touch panel provided in the display unit;
a frame display controller which displays a frame for focus on the display unit if an operation portion approaches the touch panel, and moves the frame for focus in accordance with the movement of the operation portion that approaches the touch panel;
an imaging controller which performs focusing on a subject is located in the frame for focus and then performs imaging in response to a photography instruction;
an imaging unit which images the subject;
a touch panel controller which judges whether the operation portion approaches the touch panel or has contacted the touch panel; and
a focus controller which performs focusing on the subject in the frame for focus,
wherein the display unit displays the moving image or the still image obtained by the imaging unit,
wherein the frame display controller displays the frame for focus on the display unit and moves the frame for focus in accordance with the movement of the operation portion in a situation in which the operation portion is approaching the touch panel,
wherein the imaging controller performs imaging by use of the imaging unit,
wherein the touch panel controller presets touch approach ranges corresponding to the distances at which the operation portion approaches the touch panel, and judges which of the touch approach ranges the operation portion is in,
wherein the frame display controller displays the frame for focus on the display screen of the display unit if the touch panel controller judges that the operation portion enters the touch approach range which is far from the touch panel among the touch approach ranges for the touch panel, and
wherein in the case where the operation portion approaches and contacts the touch panel from a perpendicular direction or an inclined direction,
the touch panel controller sets first and second touch approach ranges and a just-before-touch range in descending order of distance of the operation portion from the touch panel,
the frame display controller displays the frame for focus on the display screen of the display unit when the operation portion enters the second touch approach range,
the focus controller performs the focusing on the subject when the operation portion enters the just-before-touch range, and
the imaging controller performs the imaging operation by use of the imaging unit when the operation portion touches the touch panel.

12. The imaging apparatus according to claim 11,
wherein the frame display controller sequentially demagnifies the size of the frame for focus whenever the operation portion comes in the second touch approach range and the operation portion approaches the touch panel.

13. The imaging apparatus according to claim 11, wherein during the focusing after the operation portion has entered the second touch approach range, the focus controller stops the focusing when the operation portion moves, and the focus controller resumes the focusing on the subject when the operation portion stops again.

14. The imaging apparatus according to claim 11, wherein the imaging controller displays an image of the subject acquired by the imaging in the imaging unit on the display screen of the display unit in a magnified form.

\* \* \* \* \*